US012307849B2

(12) United States Patent
Roper et al.

(10) Patent No.: US 12,307,849 B2
(45) **Date of Patent: *May 20, 2025**

(54) INTELLIGENT INTEGRATED LOCKING DEVICES AND SYSTEMS

(71) Applicant: Acuity Technical Designs, LLC, Phoenix, AZ (US)

(72) Inventors: Brian K. Roper, Phoenix, AZ (US); Todd K. Roper, Glendale, AZ (US); Daniel Blanc-Gonnet, Phoenix, AZ (US)

(73) Assignee: Integrated Solutions, Inc., Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/104,762

(22) Filed: Feb. 1, 2023

(65) Prior Publication Data

US 2023/0186709 A1 Jun. 15, 2023

Related U.S. Application Data

(63) Continuation of application No. 17/397,450, filed on Aug. 9, 2021, now Pat. No. 11,580,807, which is a (Continued)

(51) Int. Cl.
*G07C 9/37* (2020.01)
*G07C 9/00* (2020.01)

(52) U.S. Cl.
CPC ........... *G07C 9/37* (2020.01); *G07C 9/00182* (2013.01)

(58) Field of Classification Search
CPC ........ F41A 17/066; F41A 17/54; E05B 47/00; E05B 15/00; E05B 55/00; E05B 65/0075; E05B 65/52; E05B 73/00; E05B 73/0005; E05B 2047/0024; E05B 47/0012; E05B 2047/0058; E05B 47/0607; E05B 2047/0086; E05B 2047/0096;
(Continued)

(56) References Cited

U.S. PATENT DOCUMENTS

| | | | | |
|---|---|---|---|---|
| 1,136,582 A * | 4/1915 | Birdsong | ................ | E05B 67/38 70/56 |
| 3,599,453 A * | 8/1971 | Bauernfeind | ............. | E05C 1/04 292/148 |

(Continued)

OTHER PUBLICATIONS https://www.action-ind.com/slide-latches; copyright 2021; total 5 pages.

(Continued)

*Primary Examiner* — Curtis J King
(74) *Attorney, Agent, or Firm* — SNELL & WILMER L.L.P.

(57) ABSTRACT

An intelligent lock, overlock, and lock system can be electrically controlled to open and close one or more locks. The lock, lock system, and method may function on a frequency selected to avoid cross talk, which permits numerous locks to function simultaneously on the same central system with little interruption or delay. A lock may be used as an overlock for an existing lock or be a primary lock and may include a pivoting engagement structure that engages a locking mechanism to provide added strength.

20 Claims, 30 Drawing Sheets

Related U.S. Application Data continuation of application No. 16/930,286, filed on Jul. 15, 2020, now Pat. No. 11,170,597.

(60) Provisional application No. 62/874,439, filed on Jul. 15, 2019.

(58) Field of Classification Search
CPC .......... E05B 2067/386; H04M 1/72527; Y10T 70/491; G07C 9/37; G07C 9/00182; G07C 9/00563; G07C 9/00944; E05C 1/04
See application file for complete search history.

(56) References Cited

U.S. PATENT DOCUMENTS

| | | | | |
|---|---|---|---|---|
| 4,227,386 | A * | 10/1980 | Crockett | E05C 1/04 70/120 |
| 4,229,956 | A * | 10/1980 | Thorburn | E05B 35/08 292/148 |
| 4,325,527 | A * | 4/1982 | Berneking | B60N 2/1685 248/394 |
| 4,345,505 | A * | 8/1982 | Patenaude | F41A 17/66 89/154 |
| 4,419,924 | A * | 12/1983 | Peter | F15B 15/082 188/170 |
| 4,437,692 | A * | 3/1984 | Halopoff | E05B 67/38 70/56 |
| 4,480,863 | A * | 11/1984 | Hormann | E05C 3/24 292/216 |
| 4,988,132 | A | 1/1991 | Rocchitelli | |
| 4,993,760 | A * | 2/1991 | Gotanda | E05C 17/365 292/264 |
| 5,287,710 | A * | 2/1994 | James | E05B 67/38 70/53 |
| 5,307,653 | A * | 5/1994 | Davis | E05C 1/04 70/56 |
| 5,664,448 | A | 9/1997 | Swan et al. | |
| 5,701,768 | A | 12/1997 | Khalsa | |
| 5,802,892 | A * | 9/1998 | Cohn | E05B 65/462 70/84 |
| 5,924,314 | A * | 7/1999 | Cernansky | E05B 17/2084 70/56 |
| 5,938,248 | A * | 8/1999 | Vickers | E05B 5/00 292/34 |
| 7,236,085 | B1 * | 6/2007 | Aronson | G06Q 20/20 109/46 |
| 7,690,229 | B2 * | 4/2010 | McKee | E05B 73/0005 292/148 |
| 8,438,884 | B1 * | 5/2013 | Bertrand | E05B 67/38 70/56 |
| 8,561,440 | B1 * | 10/2013 | Sierra | E05B 13/10 70/56 |
| 8,596,100 | B1 * | 12/2013 | Crispell | E05B 13/001 70/56 |
| 9,032,765 | B2 | 5/2015 | Boesel et al. | |
| 9,212,508 | B2 * | 12/2015 | Loughlin | E05C 19/186 |
| 9,551,167 | B2 * | 1/2017 | Pickard | E05B 67/06 |
| 10,221,587 | B1 * | 3/2019 | Bergman | E05B 13/002 |
| 11,118,375 | B1 * | 9/2021 | Zastrow | E05B 65/0021 |
| 11,505,967 | B2 * | 11/2022 | Mantena | E05B 55/00 |
| 11,920,378 | B2 * | 3/2024 | Barnett, III | E05B 47/0012 |
| 2002/0148259 | A1 * | 10/2002 | Finkelstein | E05B 65/0053 70/92 |
| 2003/0106356 | A1 * | 6/2003 | Porter | E05C 9/12 70/278.3 |
| 2003/0137155 | A1 * | 7/2003 | Baranski | E05B 15/024 292/341.18 |
| 2004/0031297 | A1 * | 2/2004 | Winland | E05B 67/38 70/2 |
| 2005/0235711 | A1 * | 10/2005 | Martin | E05B 65/08 70/100 |
| 2005/0237149 | A1 * | 10/2005 | Loftin | E05B 47/06 340/5.31 |
| 2005/0288077 | A1 | 12/2005 | Wu | |
| 2006/0065023 | A1 * | 3/2006 | Loughlin | E05B 67/383 70/18 |
| 2006/0118253 | A1 * | 6/2006 | Slusarski | E06B 9/86 160/271 |
| 2006/0123856 | A1 * | 6/2006 | Loughlin | E05C 19/186 70/18 |
| 2008/0041123 | A1 * | 2/2008 | McKee | E05B 67/383 70/20 |
| 2008/0127687 | A1 * | 6/2008 | Henson | E05B 67/383 70/129 |
| 2009/0217713 | A1 * | 9/2009 | Loughlin | E05B 67/003 70/53 |
| 2009/0260407 | A1 * | 10/2009 | Henson | E05C 1/04 70/129 |
| 2009/0282875 | A1 * | 11/2009 | Olmsted | E05B 65/48 70/2 |
| 2010/0031715 | A1 * | 2/2010 | Bundy | E05B 13/00 70/129 |
| 2012/0118028 | A1 * | 5/2012 | Lemley | E05B 65/0003 70/91 |
| 2015/0102609 | A1 | 4/2015 | Johnson et al. | |
| 2016/0083977 | A1 * | 3/2016 | Pickard | E05B 67/06 70/431 |
| 2017/0328087 | A1 * | 11/2017 | Pickard | E05B 67/38 |
| 2018/0062870 | A1 | 3/2018 | Rovito et al. | |
| 2019/0088048 | A1 | 3/2019 | Minsely et al. | |
| 2019/0122293 | A1 | 4/2019 | Minsely et al. | |
| 2019/0251769 | A1 | 8/2019 | Gnanachandran et al. | |
| 2019/0323265 | A1 | 10/2019 | Robillard et al. | |
| 2019/0352935 | A1 * | 11/2019 | Cox | E05B 63/0017 |
| 2019/0360240 | A1 | 11/2019 | Ramsay | |
| 2020/0005390 | A1 | 1/2020 | Minsely et al. | |
| 2021/0054659 | A1 * | 2/2021 | Hill | E05B 47/0012 |
| 2021/0097792 | A1 | 4/2021 | Minsely et al. | |
| 2022/0042349 | A1 * | 2/2022 | Barnett, III | E05B 47/0603 |

OTHER PUBLICATIONS https://www.northshorecommercialdoor.com/miwadolo.html; copyright 2007-2021; total 6 pages.
https://www.allfrom1supply.com/latches-hasps-accs.html; copyright 202; total 3 pages.

* cited by examiner

INTELLIGENT INTEGRATED LOCKING DEVICES AND SYSTEMS

CROSS-REFERENCE TO RELATED APPLICATIONS

This application is a continuation of U.S. patent application Ser. No. 17/397,450 filed Aug. 9, 2021, and entitled "Intelligent Integrated Locking Devices and Systems," which is a continuation of U.S. patent application Ser. No. 16/930,286 filed Jul. 15, 2020, now U.S. Pat. No. 11,170,597, and entitled "intelligent integrated Locking Devices and Systems," which claims the benefit of U.S. Provisional Patent Application Ser. No. 62/874,439 filed Jul. 15, 2019, and entitled "Intelligent integrated Locking System." The entire contents of each of the foregoing applications are hereby incorporated by reference in their entirety.

BACKGROUND

Physical locks, including electrically-controlled and remotely-controlled locks are suitable for numerous uses, including for: homes, vehicles, businesses, and storage units. Such locks can be used to protect essentially anything, such as, physical items, electronic files, documents, contracts, deeds, titles, certificates, insurance policies, photographs and negatives, jewelry, cash, heirlooms, collections (e.g., coins, or stamps), prescription medications, and firearms.

As technology advances, it is preferable to have an intelligent lock that can link to a personal device, such as a phone, computer, tablet or other personal electronic device. Such a lock may preferably also be linked to service providers that monitor the lock, and thereby monitor the items protected by the lock.

SUMMARY OF THE INVENTION

This disclosure is for intelligent locks and systems comprising multiple locks, such as a system with a primary lock and an overlock. Each may preferably be used in the self-storage industry, as well as in other industries and applications. Using a suitable communications methodology, preferably coupled with RF radio frequency methods of communicating with devices, the tracking, monitoring, and operating of multiple locks is feasible.

A lock according to this disclosure could include an engagement structure having: (1) a first position in which it can engage and retain a locking mechanism, such as a sliding locking arm ("slide bar" or "sliding bar"), and (2) a second position in which it does not engage the locking mechanism and the sliding bar can be moved to an open position and structure that was locked can then be opened.

In one embodiment, the engagement structure includes at least a first leg. When the engagement structure is in its first position, the leg is inside of the lock body and the locking mechanism is not locked. The engagement structure can be moved to a second, closed position wherein it engages an opening in the locking mechanism and locks the locking mechanism into a locked position. In this position, the locking mechanism cannot be moved to its open position and the structure is locked. When the engagement structure is in its first position the leg is positioned outside of the opening and does not restrict the locking mechanism from moving to its open position. The structure, such as a storage unit, that was locked can then be opened.

The engagement structure may also have more than one leg and/or multiple legs that are received in one or more openings in the locking mechanism. For example, an engagement structure may have two legs that each engages one of two separate openings when the legs are in their second, extended position.

The engagement structure can move from its first position to its second position in any suitable manner. For example, the engagement structure may move straight up and down, or move up and down at an angle, or rotate up and down around a pivot rod. The engagement structure most preferably moves in response to an electronic signal or command that operates an electric motor.

In one embodiment, the engagement structure has one leg. The leg has a proximal surface (which is closest to the opening in the locking mechanism when the locking mechanism is in its unlocked position). The leg also includes a distal surface, which is farthest from the opening when the locking mechanism is in its unlocked position. In one embodiment the proximal surface is either angled or curved so when the first end of the locking mechanism is moved into contact with the leg it presses against the proximal surface of the leg. The force applied by the first end of the locking mechanism pushes the leg of the engagement structure out of the way of the locking mechanism and moves the engagement structure to its first position. As the first end of the locking mechanism moves farther, the opening aligns with the leg, and the leg then moves back into its second position where it is positioned in the opening and retains the locking mechanism in its locked position.

The engagement structure can also, or instead, be moved from the first position to the second position, or from the second position to the first position. If moved electrically, an electric motor or other device is activated to physically move the engagement structure from its first position to its second position, or vice versa, and in this embodiment the engagement structure is preferably biased to its first, open position. As previously described, when the engagement structure is in its first position, it allows for passage of the locking mechanism to its unlocked position so the structure can be opened. When the engagement structure is in its second position it can engage the opening to maintain the locking mechanism in its locked position.

A lock according to this disclosure may be the sole lock for a structure, such as a storage unit, or function as an overlock for an existing ("primary") lock. The overlock is a secondary locking feature, which could be a separate lock or a second leg of the existing lock, which could be activated to provide an overlock. Or, the overlock could electronically disable the ability of a user to unlock the existing lock and access a structure. For example, if the user had not paid a bill, or if there was a legal dispute over the contents of the locked structure. Preferably, only the service provider, and not an individual user could override the overlock feature.

Both the smart lock system (as a sole lock) and the smart lock (as an overlock) are designed to be attached or installed on a structure, for example a self-storage rollup door, without requiring to open the structure thereby exposing the contents or requiring ingress into a private space. The smart lock system of this disclosure can be attached in any suitable manner, such as with rivets, screws, bolts, or a combination of installing Rivnut® type hardware in conjunction with security screws or bolts after drilling holes in the structure.

Methods of electronically using and managing locks or lock systems are also disclosed herein.

DETAILED DESCRIPTION

Turning now to the drawings, where the purpose is to describe preferred embodiments and not to limit the scope of the claims, FIGS. 1-14 show a lock system 1 with a lock 10 mounted to a base plate 2. Lock system 1 is preferably attached to a structure to be locked, such as to the door of a storage unit. Base plate 2 may be attached to the structure to be locked in any suitable manner, such as by screws, bolts or rivets 17. Lock 10 may be also attached in any suitable manner to base plate 2, but preferably by screwing, bolting, or riveting it into position.

Figure 1:
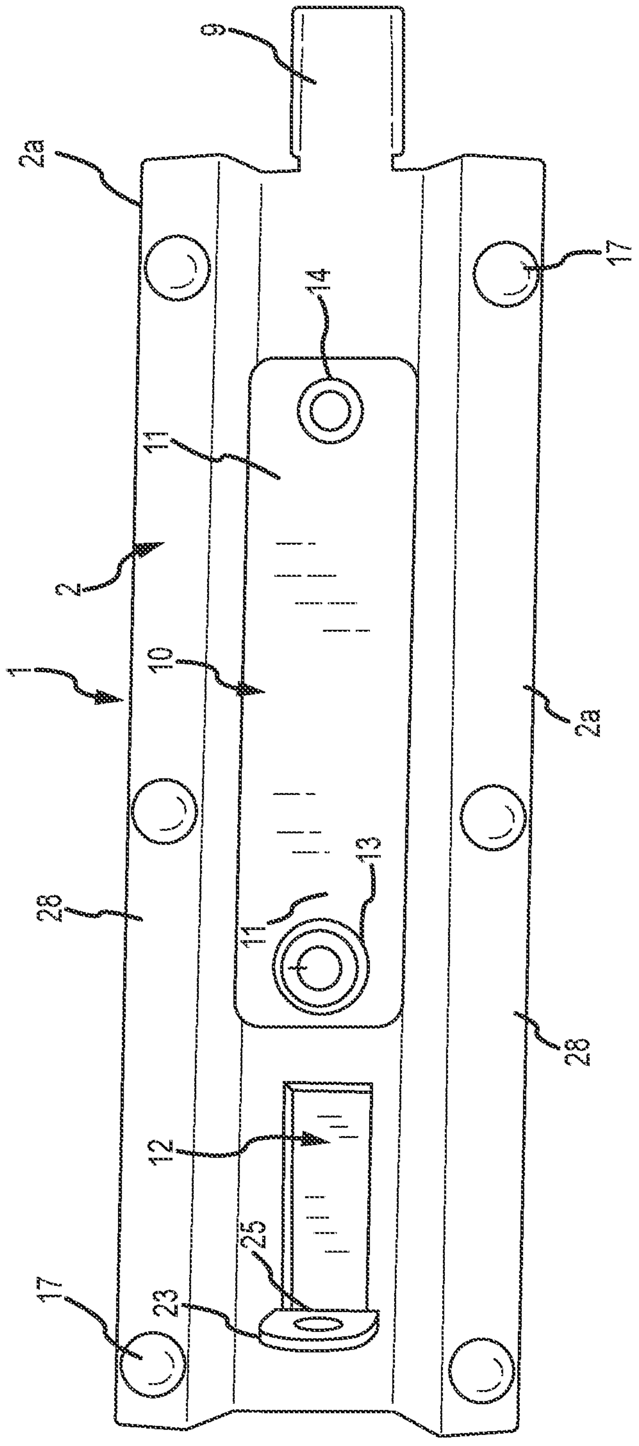
FIG. 1 is a top view of an intelligent lock mounted to a base plate with a locking mechanism.
Figure 2:
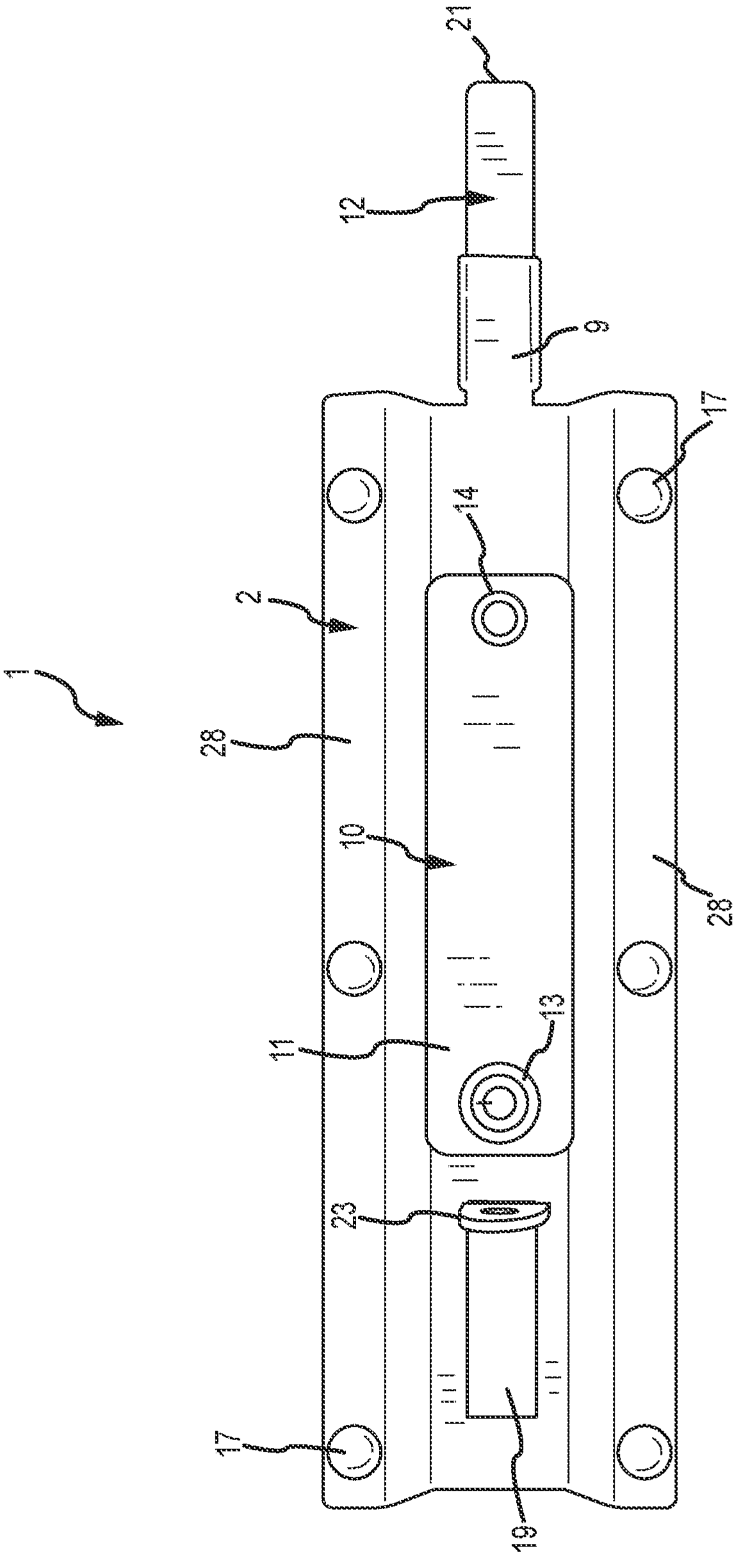
FIG. 2 is a top view of the intelligent lock of FIG. 1 with the locking mechanism extended.
Figure 3:
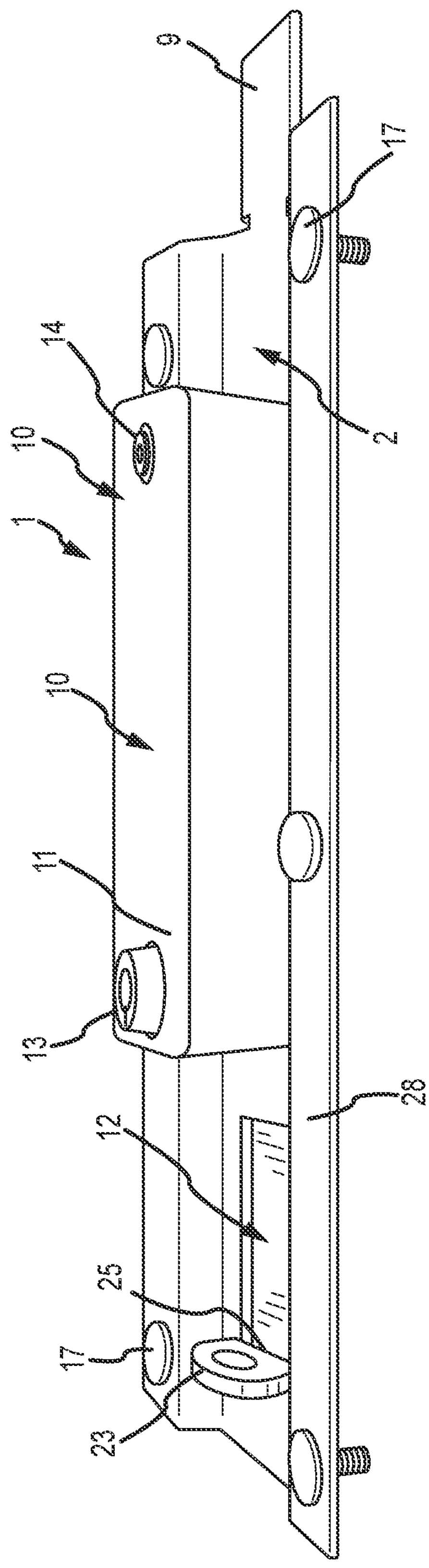
FIG. 3 is a side view of the intelligent lock and locking mechanism of FIG. 1.
Figure 4:
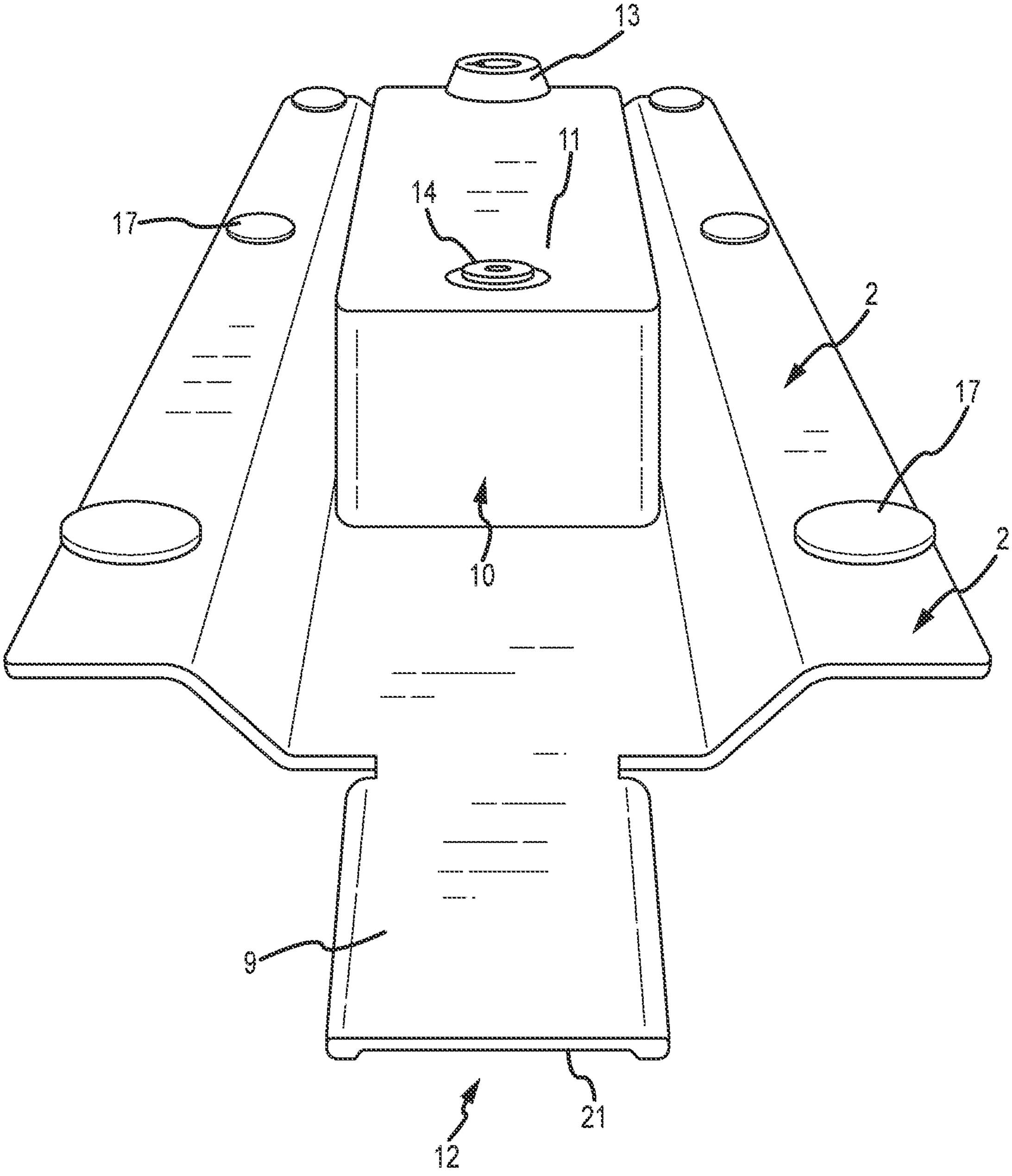
FIG. 4 is an end, perspective view of the intelligent lock and locking mechanism of FIG. 1.
Figure 5:
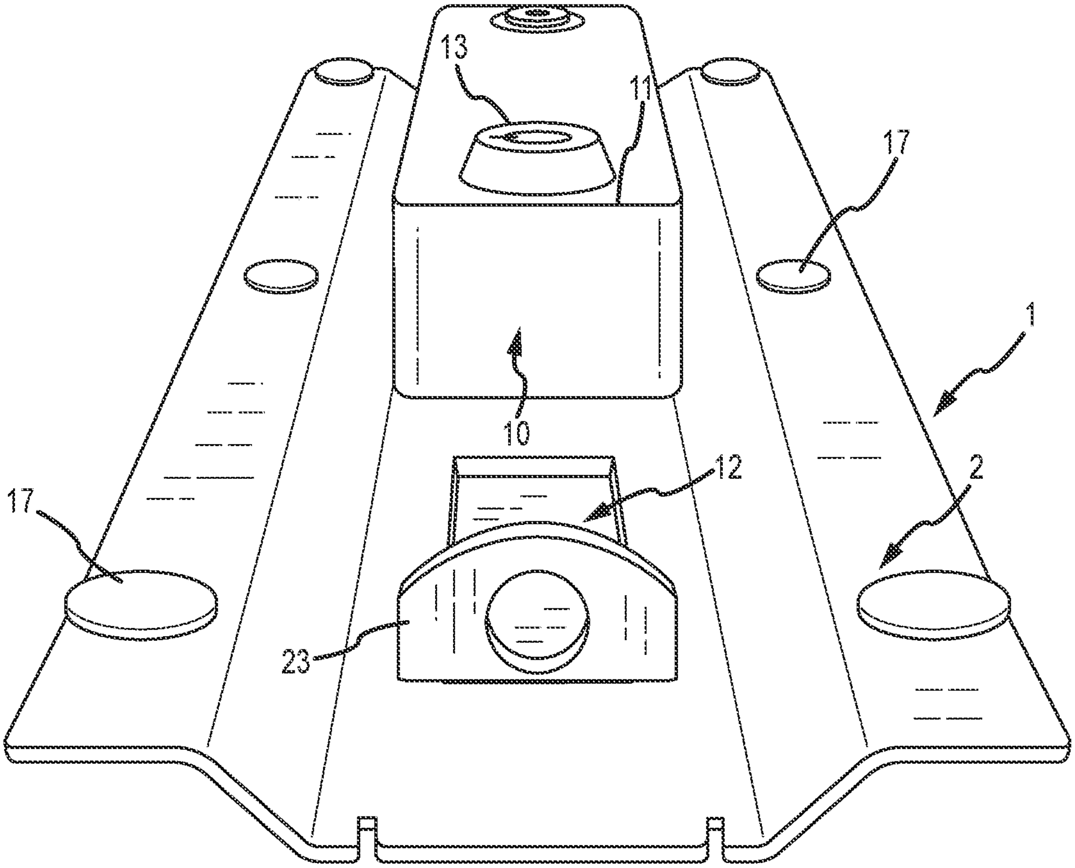
FIG. 5 is an opposite end view of the intelligent lock and locking mechanism of FIG. 1.

Lock system 1 has a base plate 2 and an intelligent, electronic lock 10. Base plate 2 includes two raised flanges 28, an extension sheath 9, an opening 33, and openings (not shown) to receive fasteners 17 that connect the base plate 2 to the structure, such as a storage unit, to be locked. A locking mechanism 12 is positioned in base plate 12 and has (as shown in FIG. 1) a first, retracted, unlocked position and can be moved to (as shown in FIG. 2) a second, extended, locked position. Locking mechanism 12 as shown is a sliding metal bar with a distal end 21, a proximal end 25, and an upwardly-extending tab 23 that can be grasped by a user in order to move locking mechanism 12. Base plate 2 has an opening 19 that exposes the proximal end 25 and tab 23 of locking mechanism 12 to permit a user to access end 25 and tab 23 in order to move locking mechanism 12.

Lock 10 has an outer cover 11, an inner lock 13 that can be removed to access an inner cavity of lock 10, and a radio 14 for transmitting and receiving electronic signals.

Figure 6:
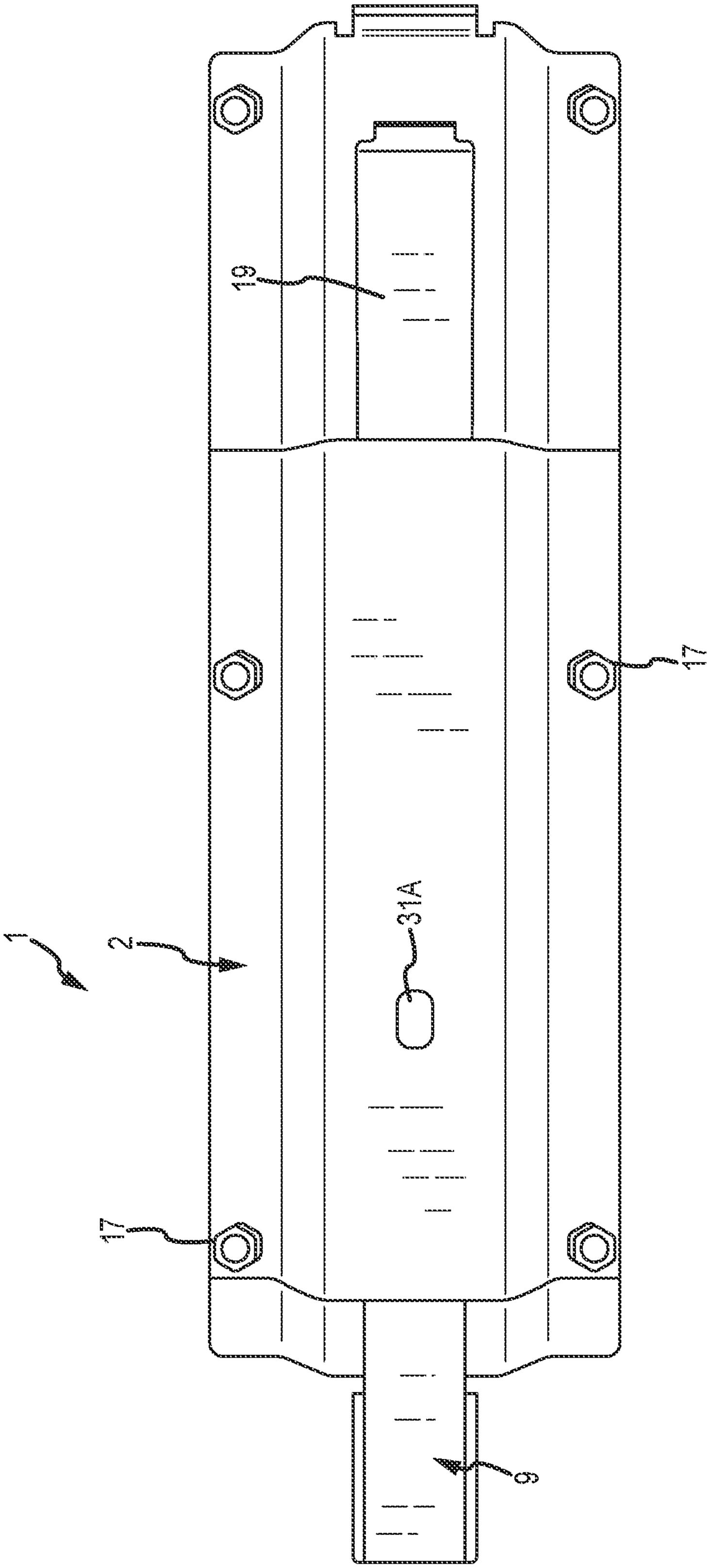
FIG. 6 is a bottom view of the intelligent lock and locking mechanism of FIG. 1 with the locking mechanism retracted.
Figure 7:
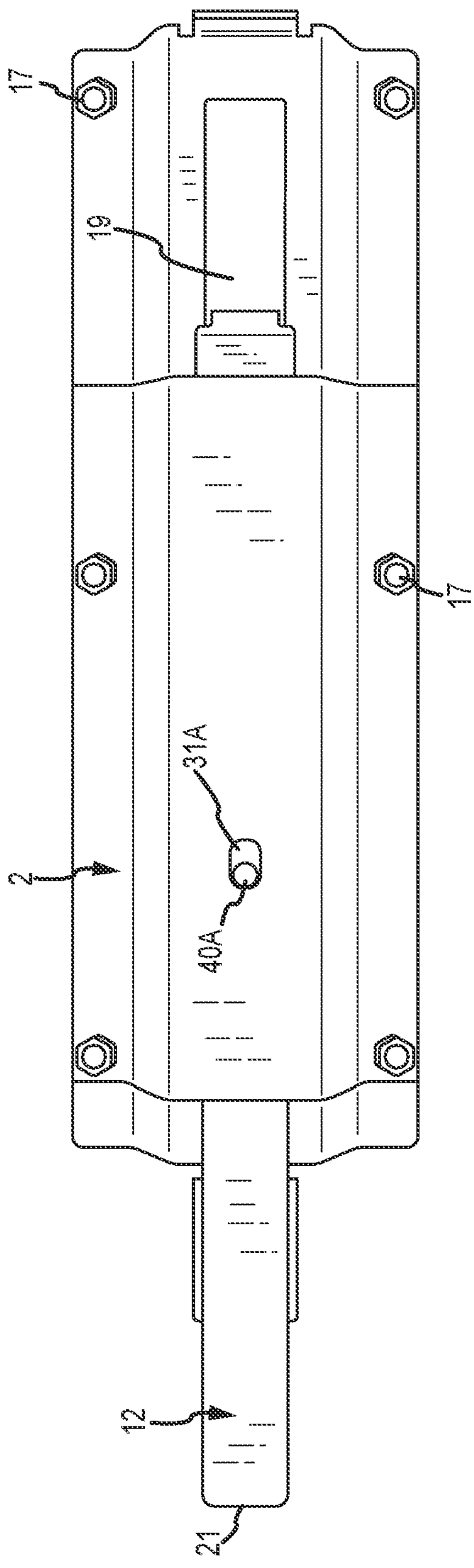
FIG. 7 is a bottom view of the intelligent lock and locking mechanism of FIG. 2 with the locking mechanism extended.
Figure 8:
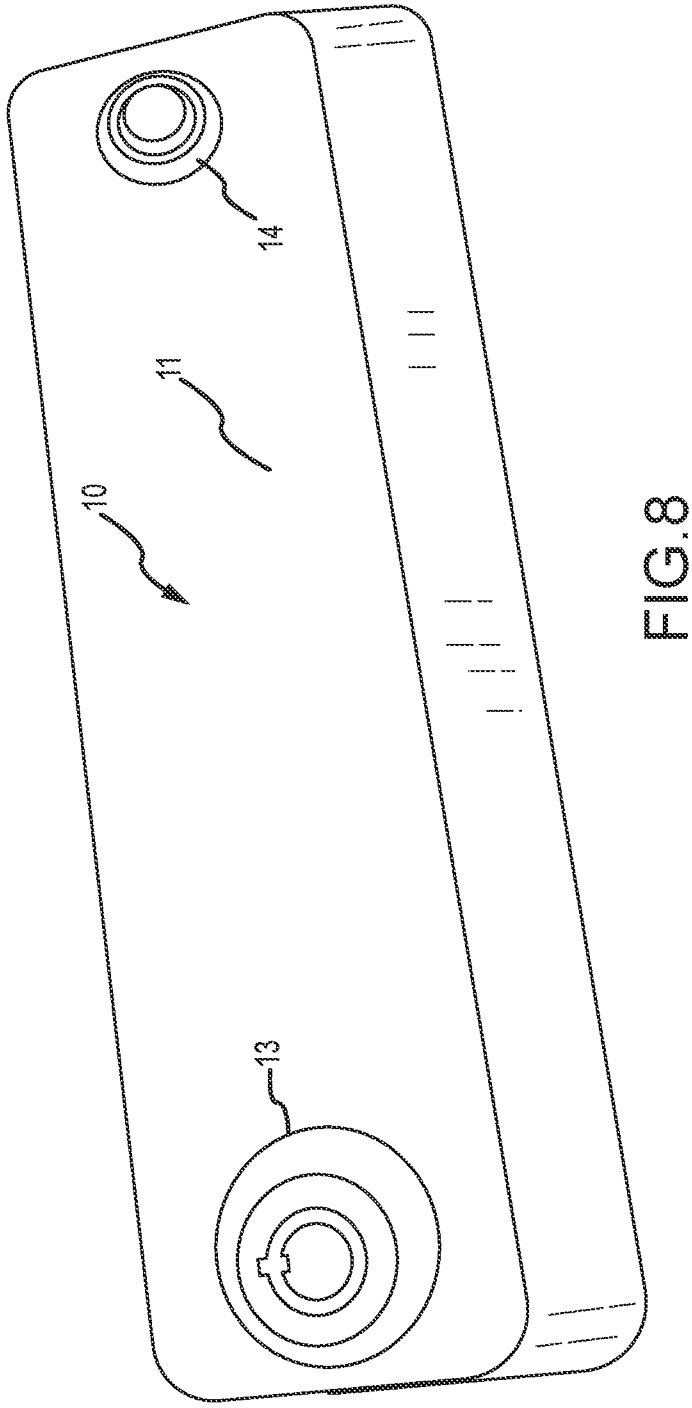
FIG. 8 is a top view of an intelligent lock according to this disclosure.

As can be seen in FIGS. 6-7, the bottom of base plate 2 has an opening 31A that is configured to receive dowel pin 40A of an engagement structure (defined below). Dowel pin 40A can only be received in opening 31A when locking structure 12 is in its second, locked position. When dowel pin 40A is positioned in opening 31A, the lock system 1 is locked and cannot be opened until dowel pin 40A is retracted to its first position in which it is not positioned in opening 31A.

Figure 9:
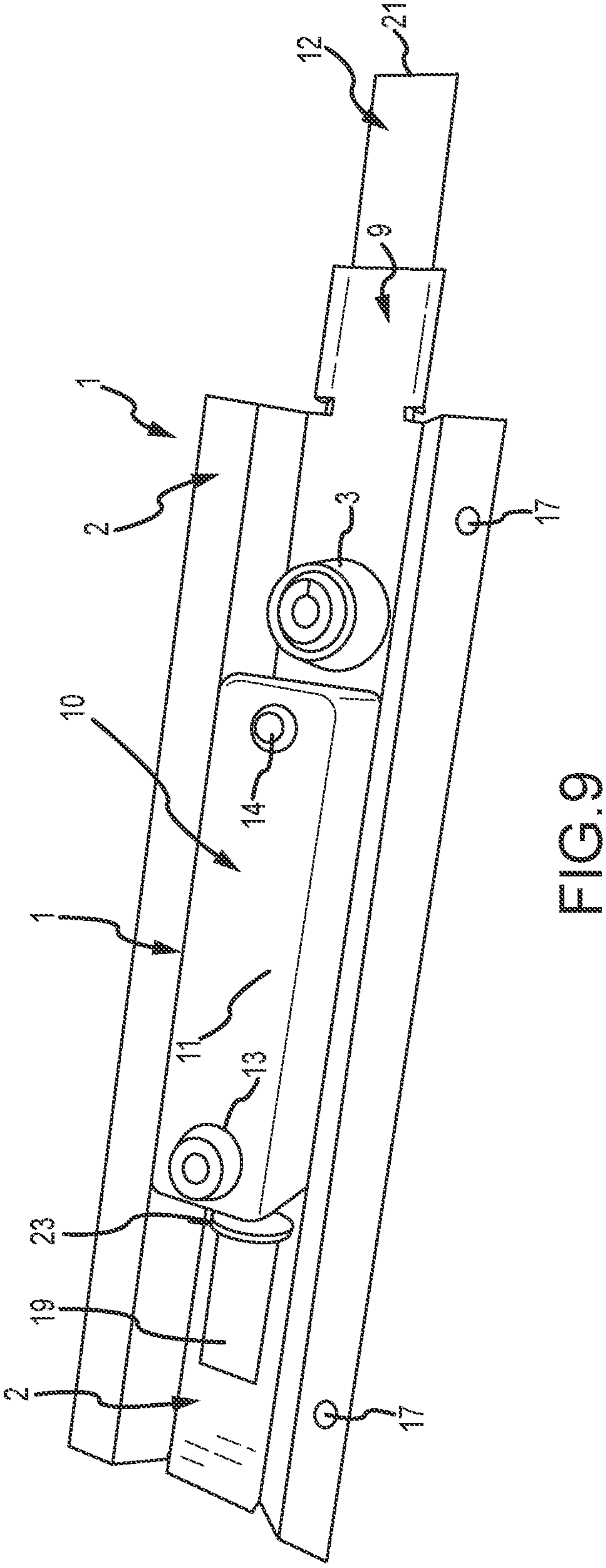
FIG. 9 is a top, perspective view of the intelligent lock and locking mechanism of FIG. 1.

FIG. 9 shows the lock system 1 of FIGS. 1-8, but further includes a manual lock 3. Manual lock 3 has a first, unlocked position, in which a locking mechanism (preferably a dowel pin, which is not shown) extends into an opening (such as opening 37 of FIG. 16) in locking mechanism 12. Manual lock 3 is known in the art and will not be described in detail here, however, it is not known to use manual lock 3 in conjunction with an electronic lock as described herein, such as electronic lock 10. The advantage of using the two locks is that in case of an electronic failure of an electronic lock according to this disclosure, such as lock 10, or the failure of a system controlling an electronic lock according to this disclosure, the manual lock 3 can still be used to lock (or overlock) a structure.

Manual lock 3 is the property of the end user or whomever is renting the structure, such as a storage unit, that is locked. In the absence of a smart lock as described herein, lock 3 would protect the contents of the unit. Now, if an end user did not pay a bill, the site owner/operator/structure owner can insert a special lock block (not shown) in cavity 33, and then manually overlock lock 3—preventing movement of locking mechanism 12—by placing a manual padlock (not shown) through the lock block and vertical flange with hole 23. One application of a smart lock as disclosed herein is that the owner/operator/structure owner may remotely and electronically overlock the unit (e.g., using RF communications, other wireless communications, or wired communications), thereby not requiring the time or effort to manually overlock the unit.

Figure 10:
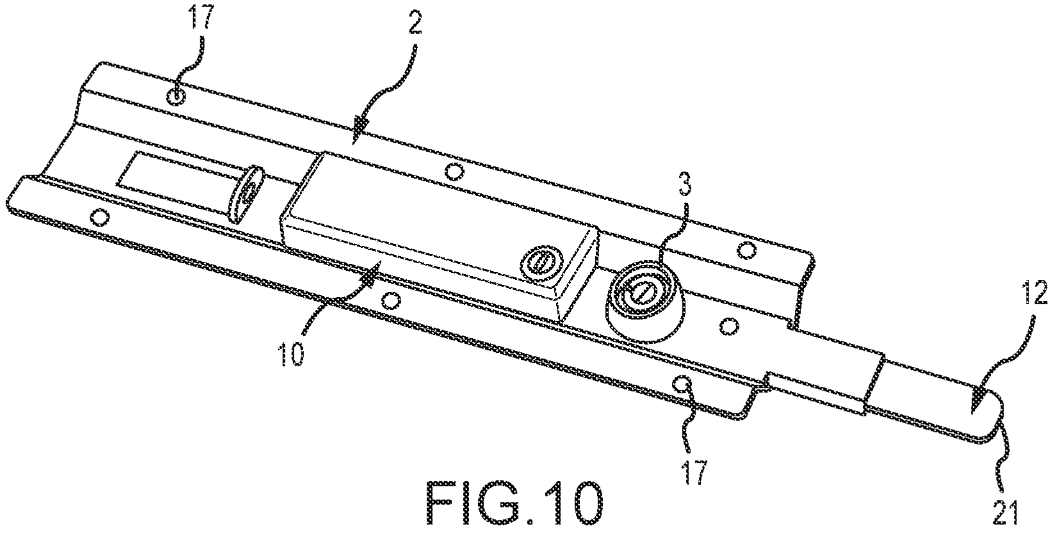
FIG. 10 is a top, perspective view of a locking structure variant according to this disclosure.
Figure 11:
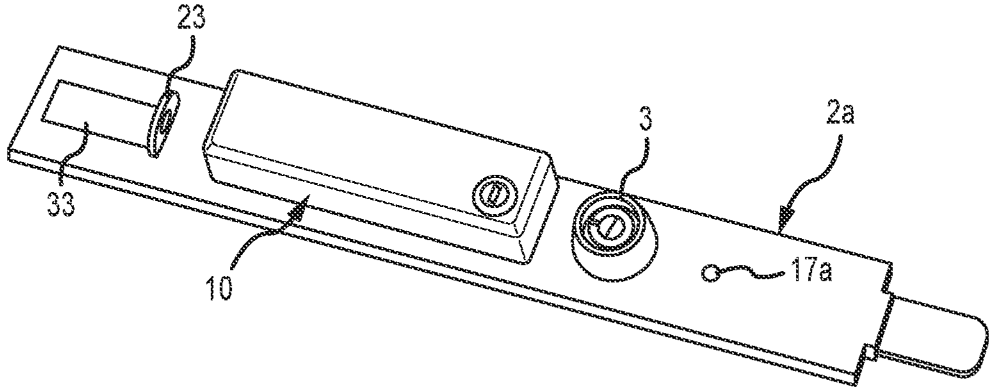
FIG. 11 is top, perspective view of a locking structure variant according to this disclosure.
Figure 12:
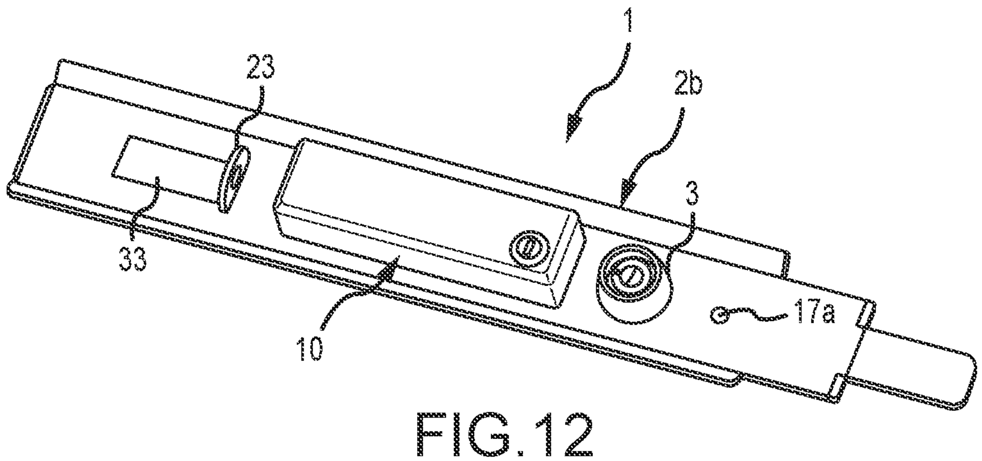
FIG. 12 is a top, perspective view of a locking structure according to this disclosure.

FIGS. 10-12 show the locking system of FIG. 9 with different base plate configurations to attach base plate 2 to a structure to be locked. FIG. 10 shows the base plate of FIGS. 1-9, which has between 4-6 fasteners. FIGS. 11 and 12 show alternate base plates, each of which utilize two (or more) fasteners, wherein each of the fasteners is preferably a rivet, screw, and/or bolt. The base plate 2*a* of FIG. 11 is preferably mounted to a flat structure. The base plate 2 of FIGS. 10 and 2*b* of FIG. 12 is preferably mounted to a corrugated surface.

Figure 13:
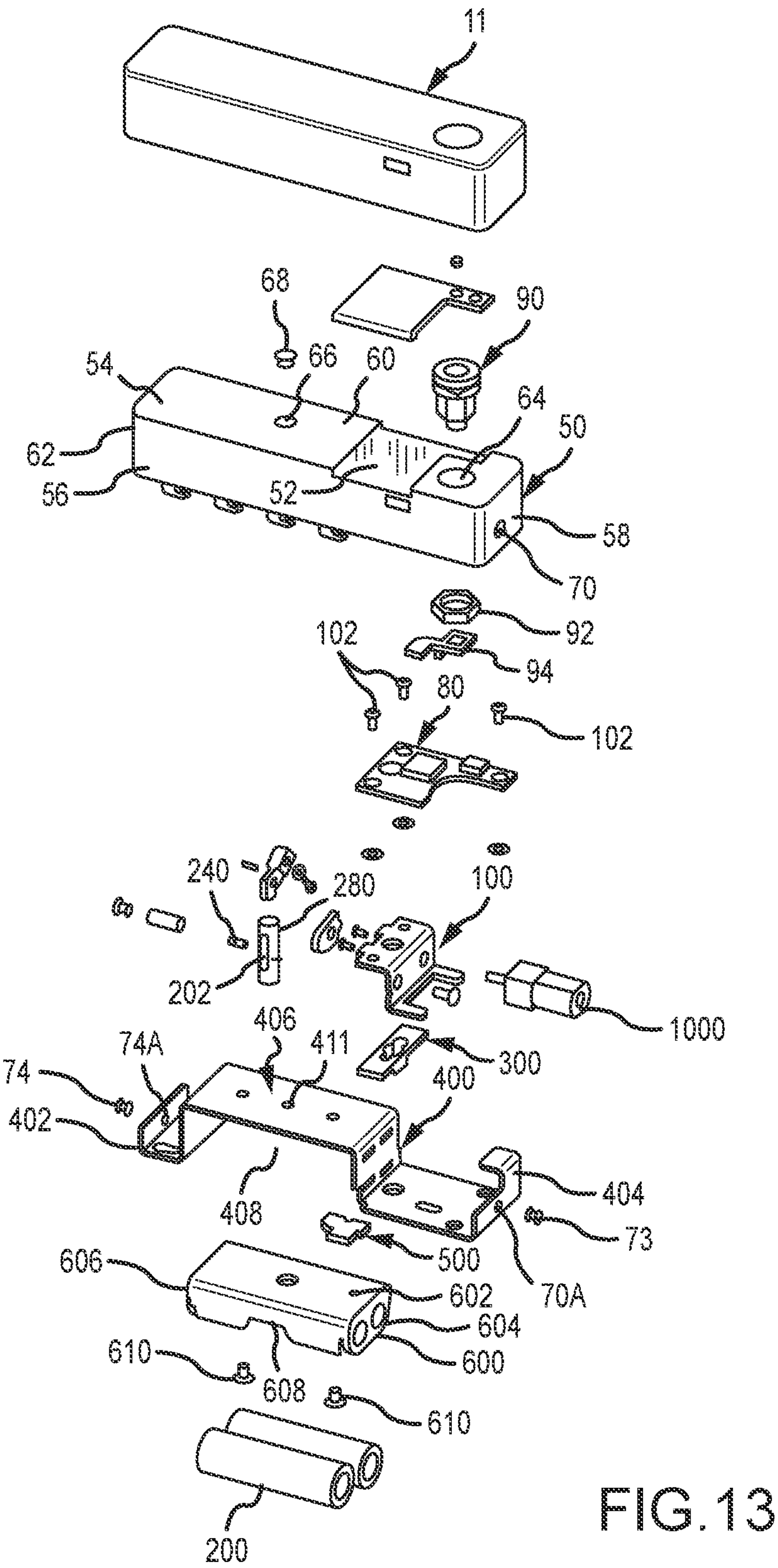
FIG. 13 is an exploded view of the lock of FIG. 8.

FIG. 13 is an exploded view of the lock 10 of FIGS. 1-12. Lock 10 preferably has an outer casing 11, which can be made of any suitable material, such as plastic or metal.

The RF top plastic cover is used so that RF radio communications can be received in and sent from the lock. An antenna is positioned below the RF plastic cover in order to optimize range and communications. The light pipe can be used for several things, such as for diagnostics or to show when the lock is sending/receiving data, or detecting low battery power conditions, as examples. The light pipe acts as a visual user interface when a user is near the lock.

Outer casing 11 can be made of any suitable material and fits over a body portion 50 that is preferably formed of aluminum although any suitable material would suffice. Body portion 50 defines any inner cavity 52 into which the components of lock 10 are received, a top surface 54, a first, or proximal, end 62, a first side 56, a second side 60, and a second, or distal end 58. An opening 64 is formed in top surface 54 and leads to cavity 52. A bore 66 is formed in top surface 54 and is configured to receive a flush rivet, which attaches to a bore in bracket 400. A bore 70 is formed in end 58 and is designed to receive a flush rivet 73 that attaches to a bore 70A in bracket 400. A bore (not shown) is formed in end 62 and is configured to receive a flush rivet 74 that attaches to a bore 74A in bracket 400.

Figure 15:
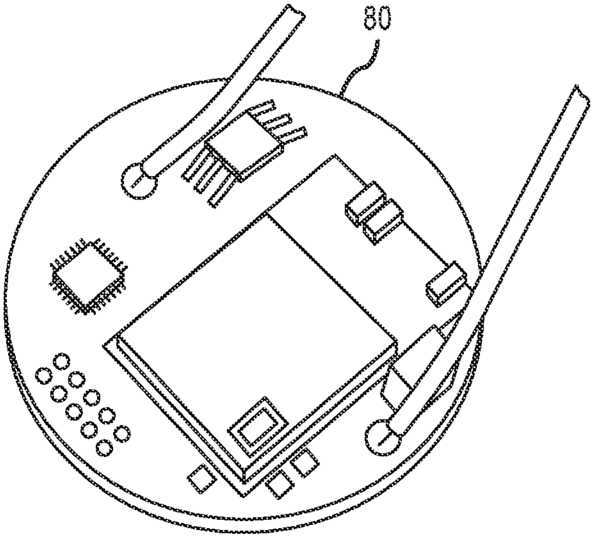
FIG. 15 is a top view of a controller that may be used in a lock according to this disclosure.

A controller 80 is configured to perform the lock operations described herein and to preferably receive and transmit electronic signals directly or indirectly to and from a user. A top view of controller 80 is shown in FIG. 15. Controller 80 can be any suitable radio technology. Controller 80 is mounted to a motor bracket 100 by one or more, and as shown, three, screws 102. An electric motor 1000 is typically a gearmotor, although any suitable motor may be used and it is connected to the motor bracket 100 in any suitable fashion.

A dowel pin 200 is mounted to motor bracket 100 on the side opposite motor 1000 and is movable upwards and downwards (relative the components in FIG. 13) and is aligned by a slotted spring pin 210 that fits in slot 202.

A main bracket 400 has a first side 402 that is connected to the body, a second side 404 that is connected to the body, and a top 406 that is connected to the body. An opening 408 is positioned under top 406.

An optional sensor printed circuit 500 is positioned at any suitable place in housing 50 and is configured to receive and communicate information from one or more sensors that are part of printed circuit board 500, such as a thermistor, accelerometer, thermocouple, VOC sensor, or other, which is described further herein.

A battery container 600 has a top 602, a first end 604, a second end 606, and a bottom 608. Fasteners 610 are received in opening in top 602 and in openings in top 406 to fasten battery container 600 to top 406 of main bracket 400, and battery container 600 is positioned in bottom 408. Batteries 700 are received in bottom 608 of battery container 600.

A keyed-alike (or inner) lock 13 fits into opening 64 and can be removed using a tool to access cavity 52 and then reattached. Keyed-alike lock 13 is most preferably a Southco CM-9-ICI109-21B-KA, although any suitable lock may be used. A hex bolt 92 and catch 94 are used to position keyed-alike lock 13 in housing 50.

Figure 16A:
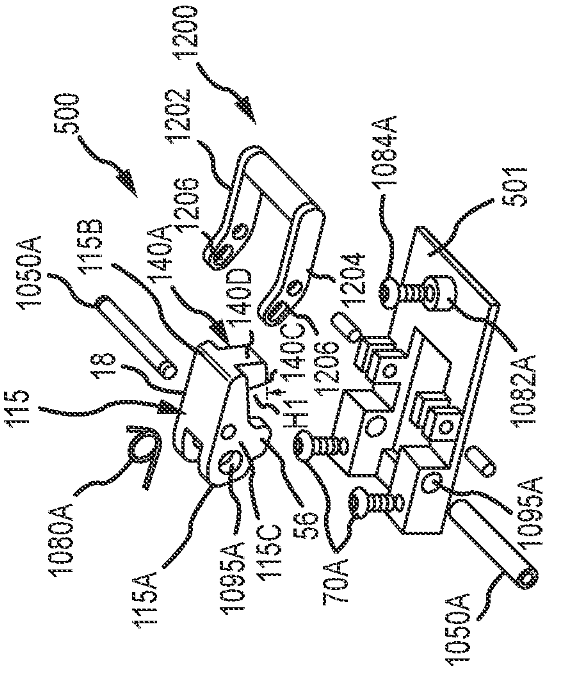
FIG. 16A is an exploded, side perspective view of the engagement structure.
Figure 16:
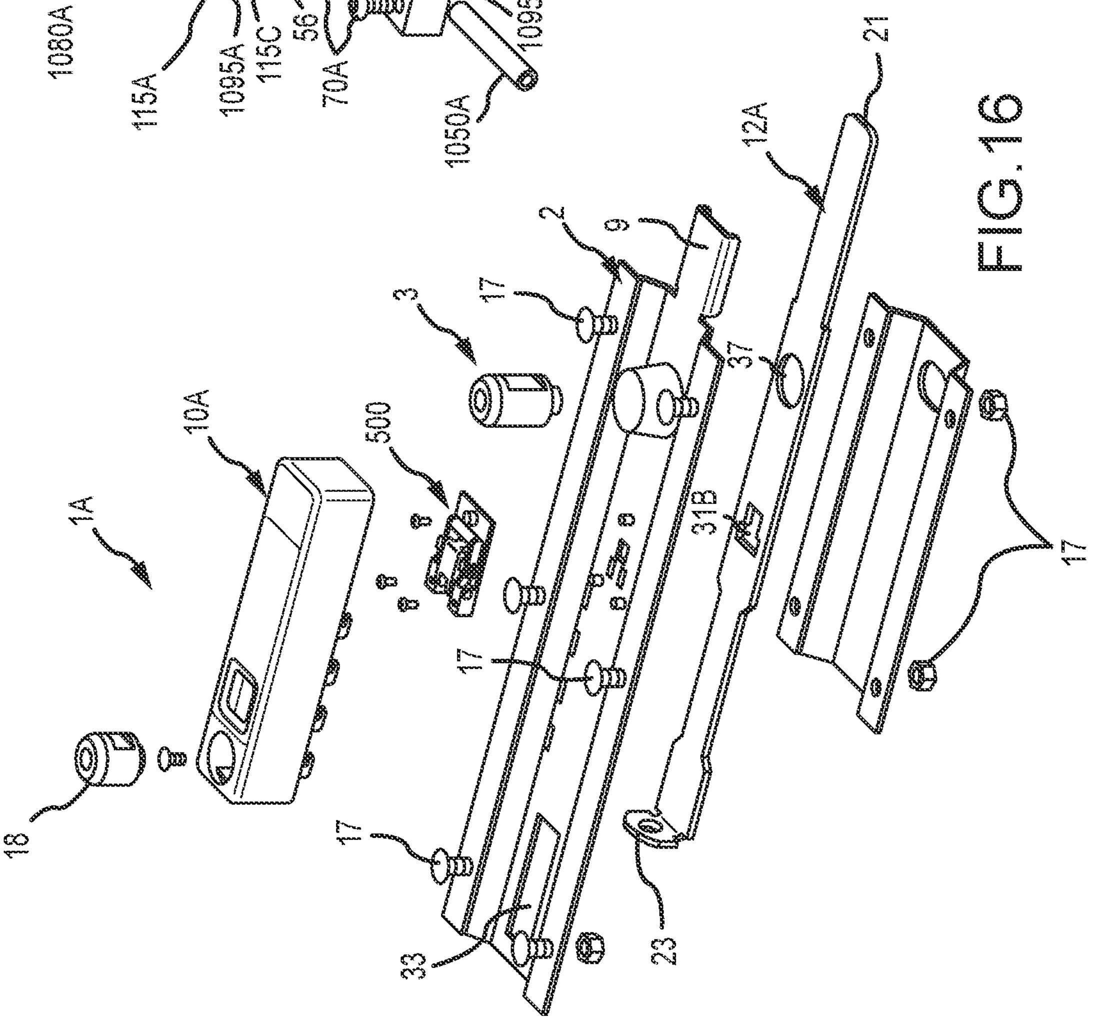
FIG. 16 is an exploded view of an alternate intelligent lock according to this disclosure.
Figure 16B:
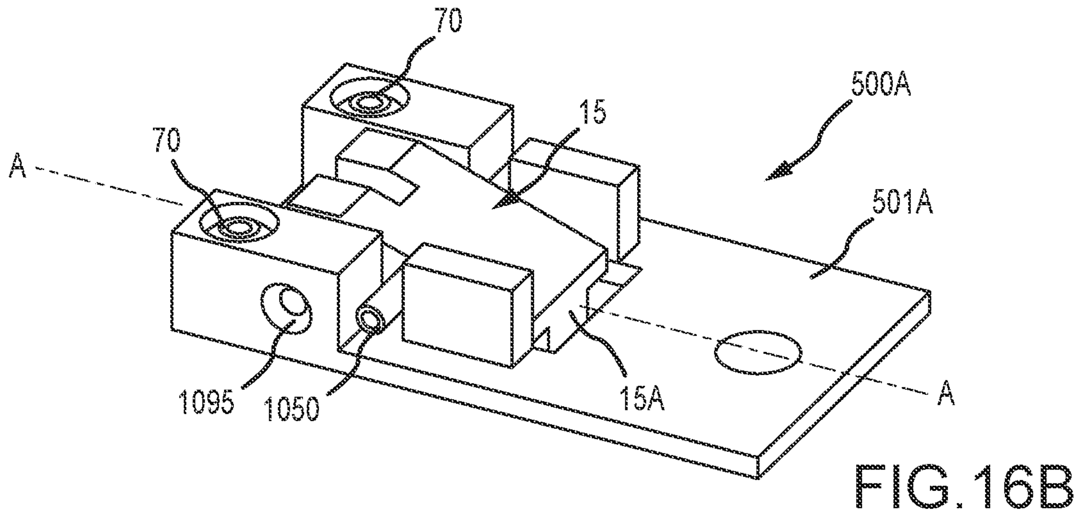
FIG. 16B is an assembled, side, perspective view of an engagement structure according to this disclosure.
Figure 17:
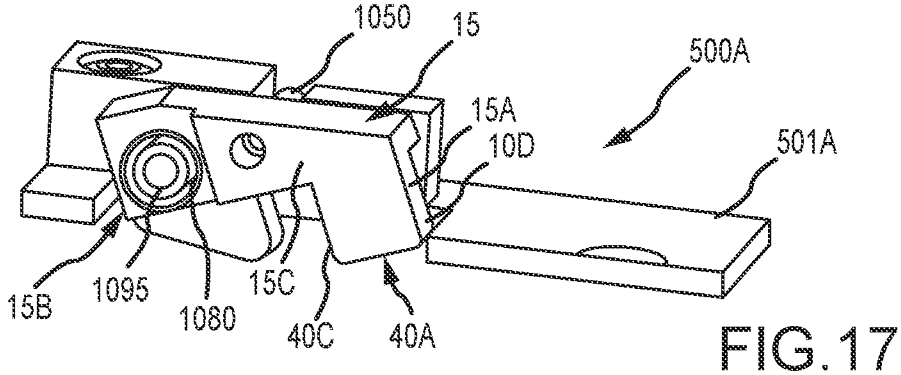
FIG. 17 is a partial, cut-away, side, perspective view of the engagement structure of FIG. 16B in a first position.
Figure 18:
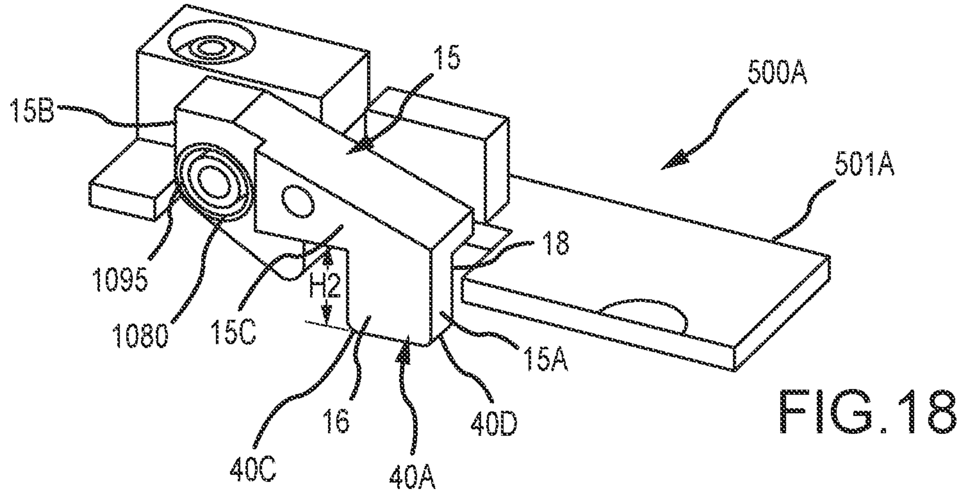
FIG. 18 is a partial, cut-away, side, perspective view of the engagement structure of FIG. 16B is a second position.
Figure 19:
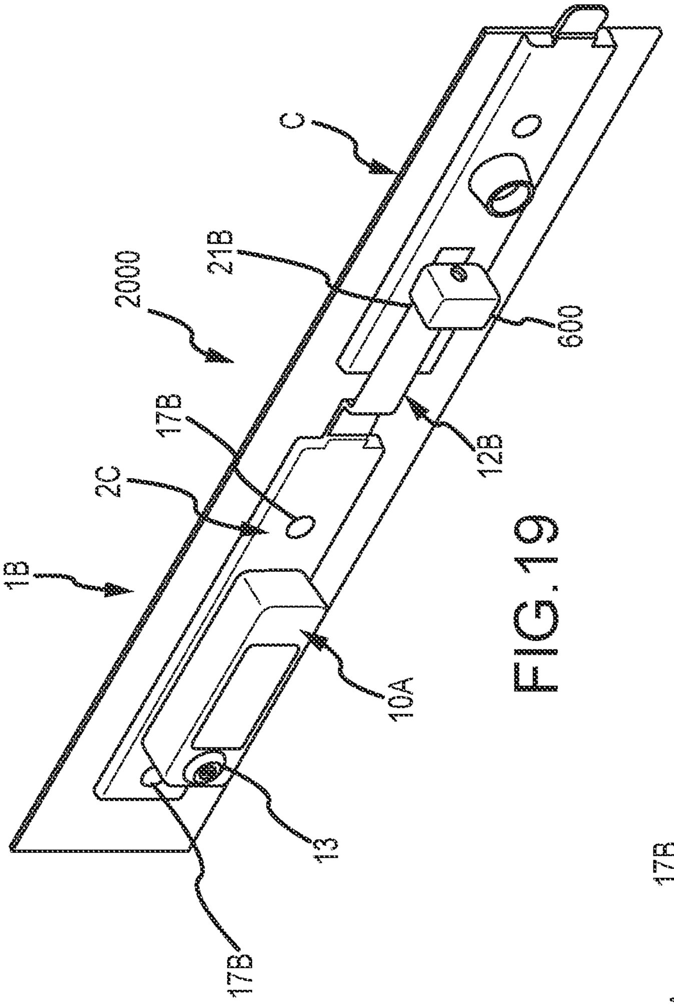
FIG. 19 is a perspective, side view of an overlock system according to this disclosure.
Figure 20:
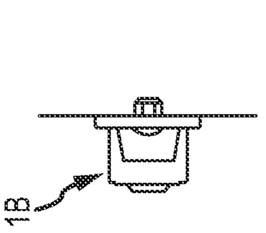
FIG. 20 is an end view of the overlock system of FIG. 19.
Figure 21:
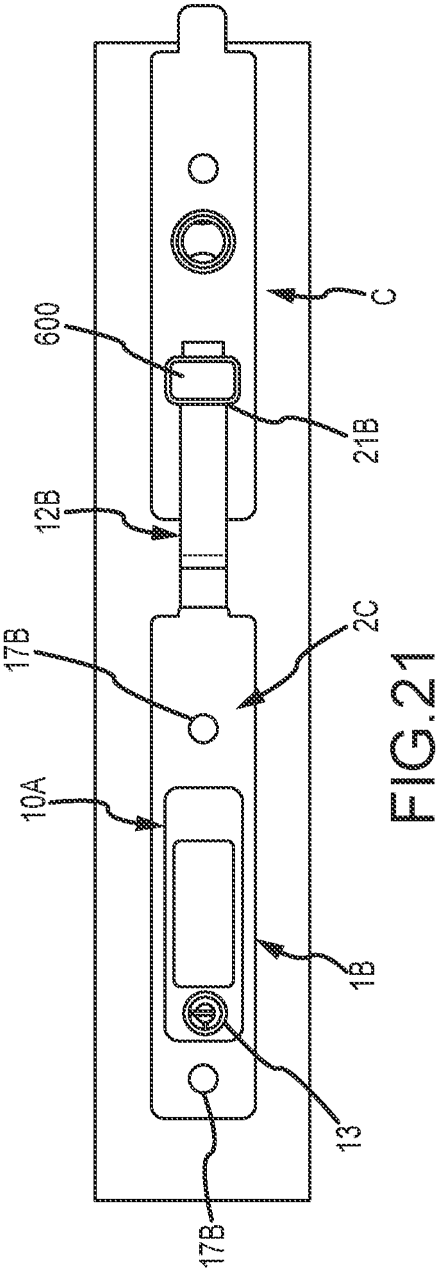
FIG. 21 is a front view of the overlock system of FIG. 19.
Figure 22:
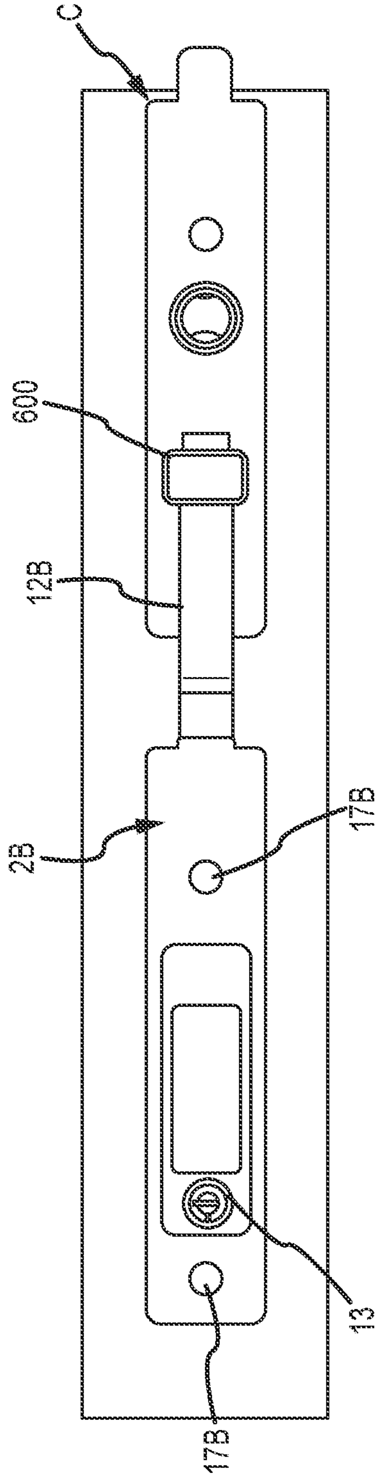
FIG. 22 is another front view of the overlock system of FIG. 19.
Figure 23:
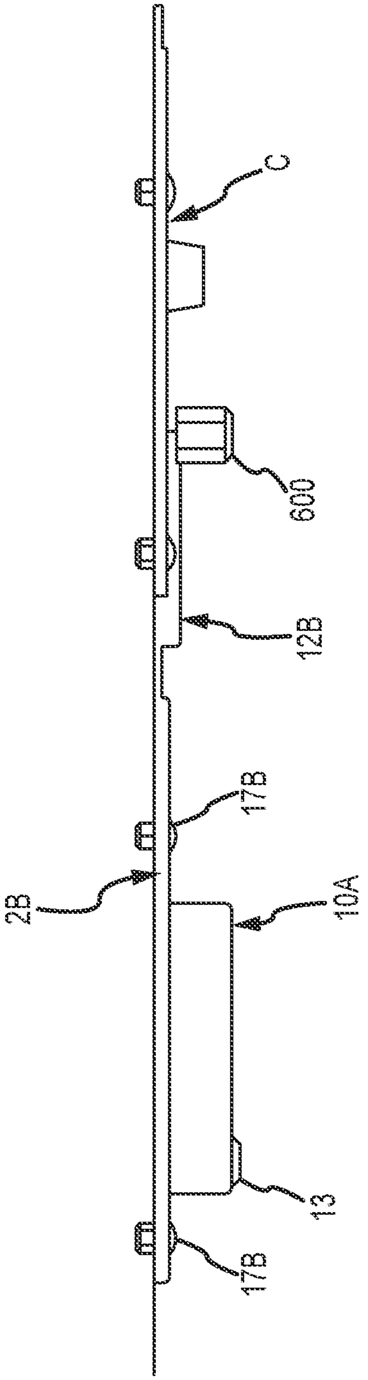
FIG. 23 is a top view of the overlock system of FIG. 22.

FIG. 16 is an alternative embodiment of a lock system 1A according to this disclosure which is the same as lock system 1 except that it includes a different engagement structure 500 and modified locking mechanism 12A. Locking mechanism 12A has an opening 31B that, as shown in this example, is T-shaped to receive a pivot arm (or leg) 115A of engagement structure 500. In this embodiment, engagement structure 500 has a first, retracted, unlocked position in which leg 115A is in its upward position, and a second, extended, locked position in which leg 115A is in its downward position and is received in opening 31B.

Engagement structure 500 has a front 115A, a back 115B, a body portion 115C, a first side 116, a second side 118, and a leg 140A. Engagement structure 500 can be comprised of any suitable material(s), such as metal.

Height H1 of leg 140A is selected so that leg 140A extends far enough when engagement structure 500 is in its second position for leg 140A to be positioned in and engage opening 31B. Accordingly, opening 31B of locking mechanism 12A can retain leg 140A when locking mechanism 12A is in its locked position.

If the leg 140A is biased to its second position, end 21 of locking mechanism 12A can be pushed past leg 140A by: (1) forming leg 140A so it is curved or angled and moves out of the path of locking mechanism 12A when it is pressed against by first end 21, or (2) using a motor (or other device) to move leg 140A to its first position to allow first end 21 to pass leg 140A. As shown in FIG. 16A, leg 40A has a proximal side 40C (nearest the opening 31B) and a distal side 140D (farthest from the opening 31B). Proximal side 140C can be angled or curved and thus configured to move out of the path of end 21, when the end 21 of locking mechanism 12A is pressed against proximal side 140C of leg 140A.

Figure 29:
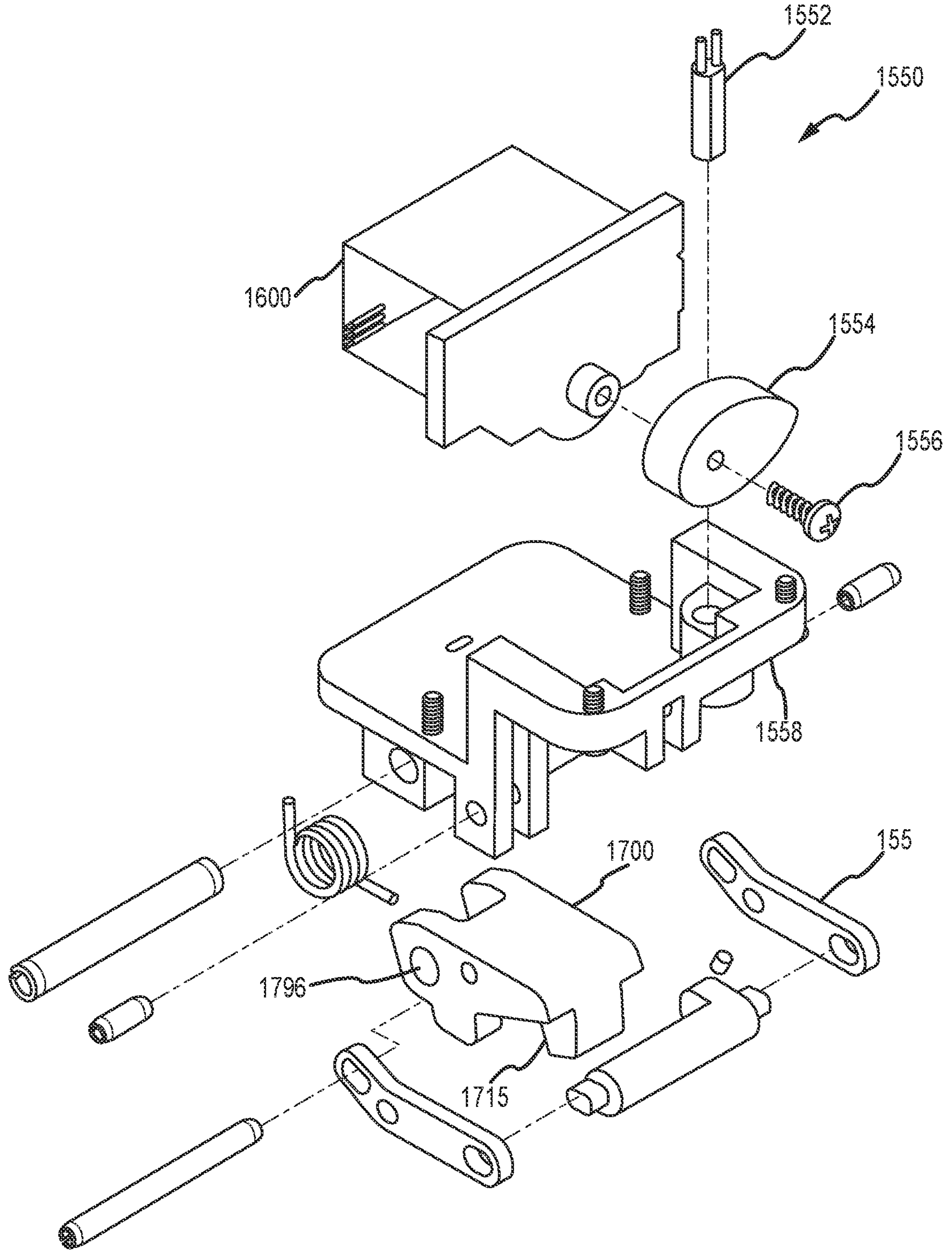
FIG. 29 is an exploded view of an engagement structure according to this disclosure.

As shown in FIGS. 13 and 29, an electric motor, such as motor 1600, can be operated to move an engagement structure, such as the engagement structure 500 with leg 140A, radially around pivot rod 1050A between its first position and its second position. In such an embodiment, the motor and engagement structure 500 are directly or indirectly connected and the motor preferably maintains the engagement structure in a biased position.

An optional biasing member 1080A, such as spring, can be positioned in any suitable manner to bias engagement structure 500 to its first position or to its second position. As shown in FIGS. 16-16A, one or more biasing members 1080A may be utilized. As shown, the biasing member 1080A is a spring that is at least partially retained in opening 1096A. Biasing member 1080 applies pressure on engagement structure 500 to bias it towards it first position or towards its second position. Instead of a compression spring, an elastomeric structure, motor, or other structure may be used to bias engagement structure 115 to its first position or to its second position.

In this embodiment, engagement structure 115 has a support plate 501 that is fastened to base plate 2. Plate 501 includes a screw boss 1082A, which receives screw 1084A, which is then screwed to base plate 2, or it passes through base plate 2 and a nut is threaded to screw 1084. Screws 70A also pass through engagement structure 500 and fasten it to base plate 2.

Figure 14:
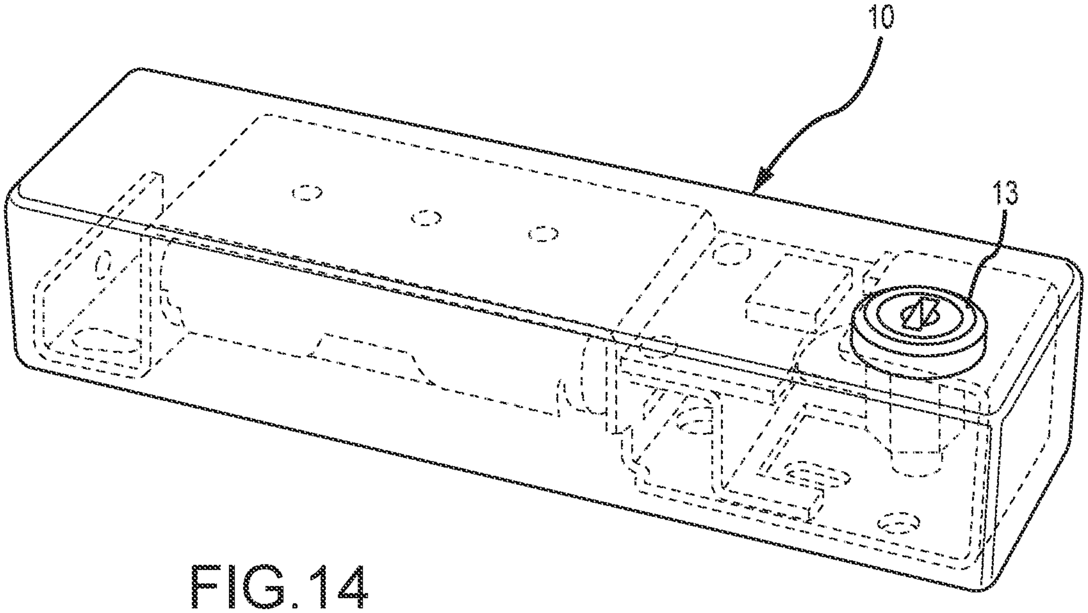
FIG. 14 is a side, perspective, open view of a smart lock according to this disclosure.

FIG. 14 is an alternate view of the lock of FIGS. 1-13 and FIG. 15 is a close up view of a controller that could be used with a lock according to this disclosure.

As shown in FIGS. 16B-18, an alternative, exemplary engagement structure 500A has a pivot arm (or leg) 15 with a front 15A, a back 15B, a body portion 15C, a first side 16, a second side 18, and a leg 40A. Engagement structure 500A can be comprised of any suitable material(s), such as metal.

Height H2 of leg 40A is selected so that leg 40A extends far enough when engagement structure 500A is in its second position for leg 40A to be positioned in and engage opening 31B. Accordingly, opening 31B of locking arm 12A will retain leg 40A while locking mechanism 12A is in its locked position.

If the leg 40A is biased to its second position, end 21 can be pushed past leg 40A by: (1) forming leg 40A so it is curved or angled and moves out of the path of locking mechanism 12A when it is pressed against by first end 21, or (2) using a motor (or other device) to move leg 40A to its first position to allow first end 21 to pass leg 40A. As shown in FIGS. 16B-18, leg 40A has a proximal side 40C (nearest the opening 31B) and a distal side 40D (farthest from the opening 31B). Proximal side 40C can be angled or curved and thus configured to move out of the path of end 21 when the end 21 of locking mechanism 12A is pressed against proximal side 40C of leg 40A.

As shown in FIGS. 13 and 29, an electric motor, such as motor 1600, can be operated to move an engagement structure, such as the engagement structure 15 with leg 40A, radially around pivot rod 1050 between its first position and its second position. In such an embodiment, the motor and engagement structure 500A are directly or indirectly connected and the motor preferably maintains the engagement structure in a biased position.

An optional biasing member 1080, such as spring, can be positioned in any suitable manner to bias the engagement structure 500A to its first position or to its second position. As shown in FIGS. 16B-18, one or more biasing members 1080 may be utilized. As shown, the biasing member 1080 is a spring that is at least partially retained in opening 1095. Biasing member 1080 applies pressure on engagement structure 500A to bias it towards it first position or towards its second position. Instead of a compression spring, an elastomeric structure, motor, or other structure may be used to bias engagement structure 15 to its first position or to its second position.

To release locking mechanism 12A and allow it to move to an open position, the engagement structure 500A is moved to its first position by operating a motor, such as motor 1000.

In this embodiment, engagement structure 500A has a support plate 501A that is fastened to base plate 2 by suitable fasteners, such as screws, bolts, or rivets.

FIGS. 19-23 show an embodiment of this disclosure used in an overlock system 2000. Lock 10A, as an example, was previously described and any electronic lock according to this disclosure may be utilized in system 2000. Lock 10A is attached to a structure by fastener 17B. Conventional lock C is known in the art and shall not be described in detail here. In an overlock application, the conventional lock C is already mounted to a structure to be locked and an electronic lock according to this disclosure is added to overlock conventional lock C for the reasons previously described.

Figure 26:
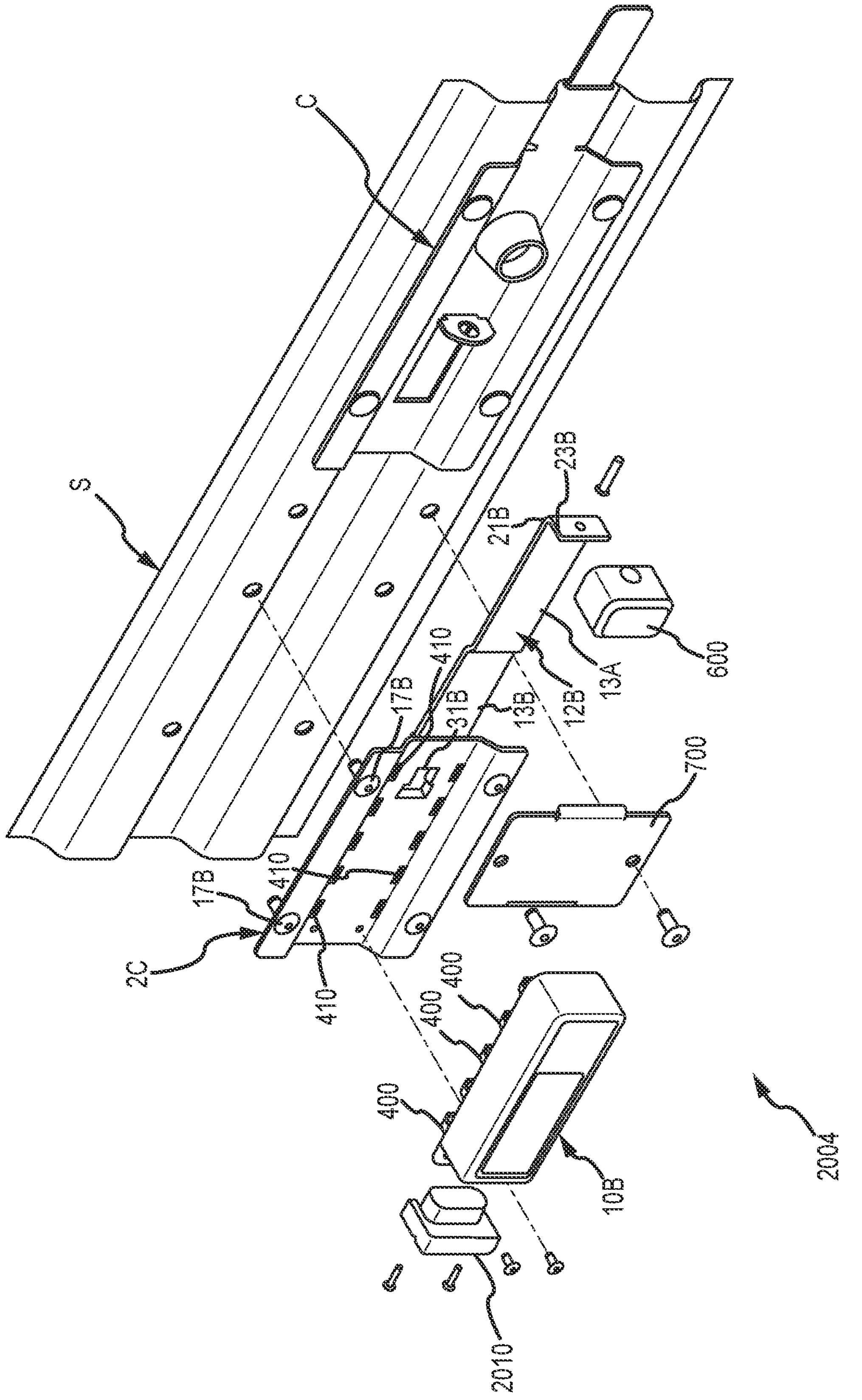
FIG. 26 is a partially exploded, perspective side view of an overlock system.

Lock system 1B is the same as previously described lock system 1 or lock system 1A except that (a) engagement structure 12B is moved manually or by a motor during normal usage, (b) there is no opening in base plate 2C to manually grasp and move engagement structure 12B, and (c) engagement structure 12B has an angled tab 23B (preferably formed at 90° relative the other portion of engagement structure 12B), which is shown in FIG. 26, at end 21B and the tab is pressed against a tab (shown in FIG. 26) on the engagement structure of conventional lock C. A hasp combiner 600 is then positioned over the two tabs and then the engagement structure of conventional lock C cannot move unless the engagement structure 12B of lock structure 1B moves. In other words, the locking mechanism of conventional lock C remains in the locked position when lock 10A is locked. This is what "overlock" means—the additional locking structure 1B ultimately determines whether the structure on which locking structure 1B and conventional lock C are positioned can be opened. If lock 10A is locked, the structure cannot be opened even if conventional lock C is unlocked. If conventional lock C or lock 10A, or both, are locked, the structure to which they are attached cannot be opened.

Figure 24:
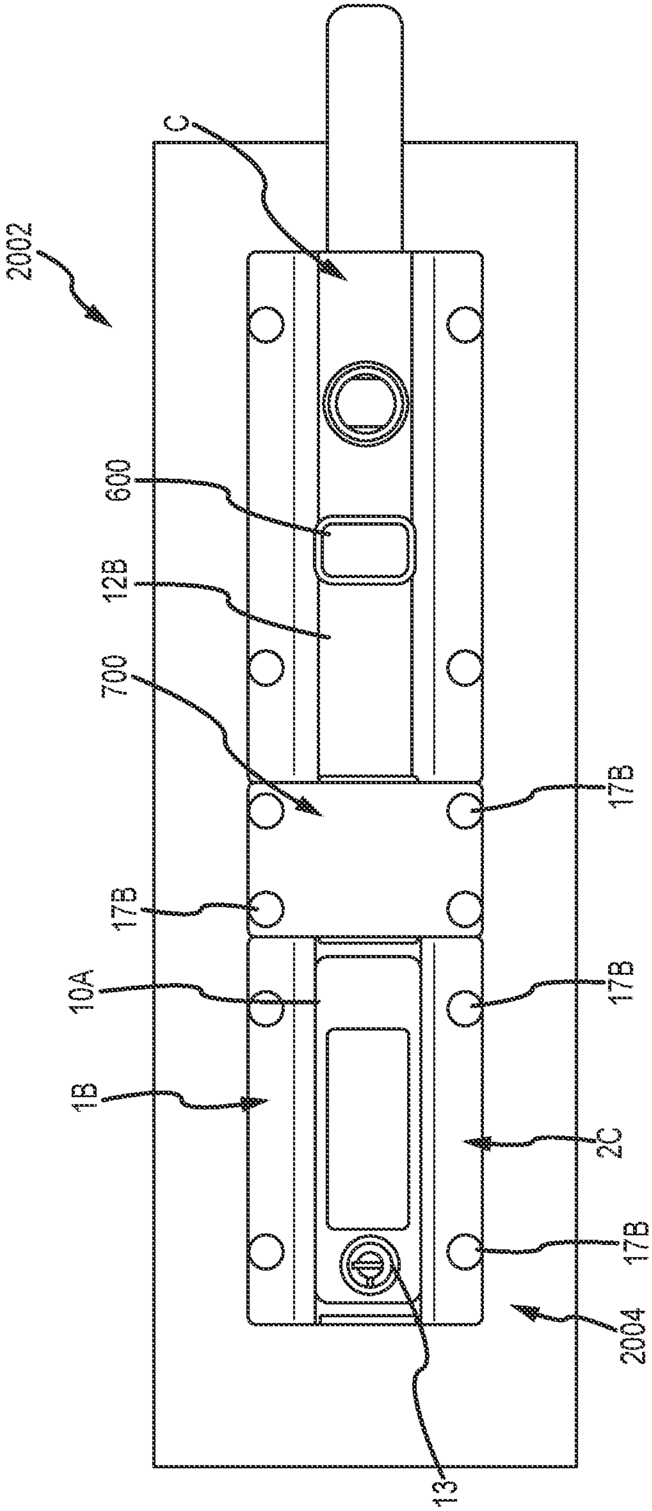
FIG. 24 is a front view of an overlock system that includes a protective structure.
Figure 25:
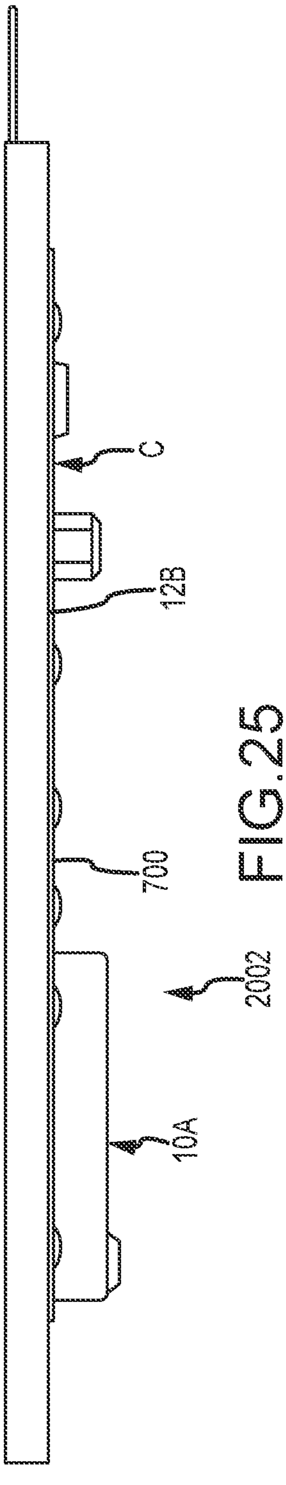
FIG. 25 is a top view of the overlock system of FIG. 24.

FIGS. 24-26 show an alternative embodiment 2002 that is the same as system 2000 but that further includes a protective structure 700, which as shown is a metal plate positioned overlock locking mechanism 12B. Structure 700 is fastened to either base plate 2C and/or to the structure that is locked. The purpose of structure 700 is added security. It helps prevent someone from prying locking mechanism 12B with a tool, such as a crow bar.

An alternate electric lock 10B according to the invention is shown in FIG. 26 with system 2004, which other than using a different lock has the same structure as system 2002. Lock 10B has a display and no inner lock on its face. It has an end cap 2010 that is removably mounted to an end of lock 10B. Using this arrangement, end cap 2010 can be removed to access the inner cavity of lock 10B to, for example, to install, remove, or replace batteries without having to remove lock 10B from the structure S or from the base plate 2C.

All of the electronic locks disclosed herein preferably have legs 400 and mating openings 410 to assist with the firm mounting of the lock to the base plate.

Alternate Lock/Overlock Structure

Figure 27:
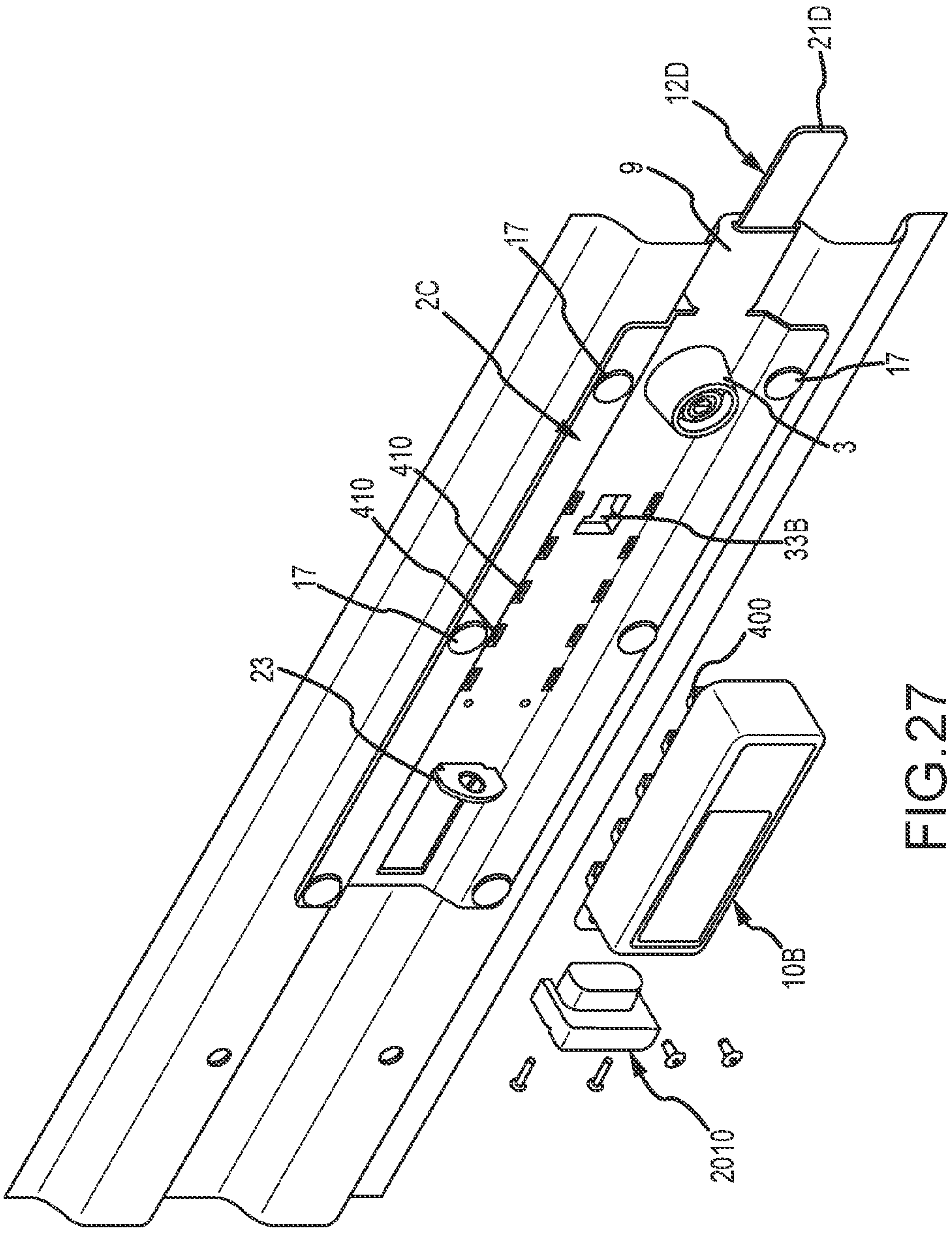
FIG. 27 is a partially exploded, side perspective view of a smart lock system according to this disclosure being used as a sole lock.
Figure 28:
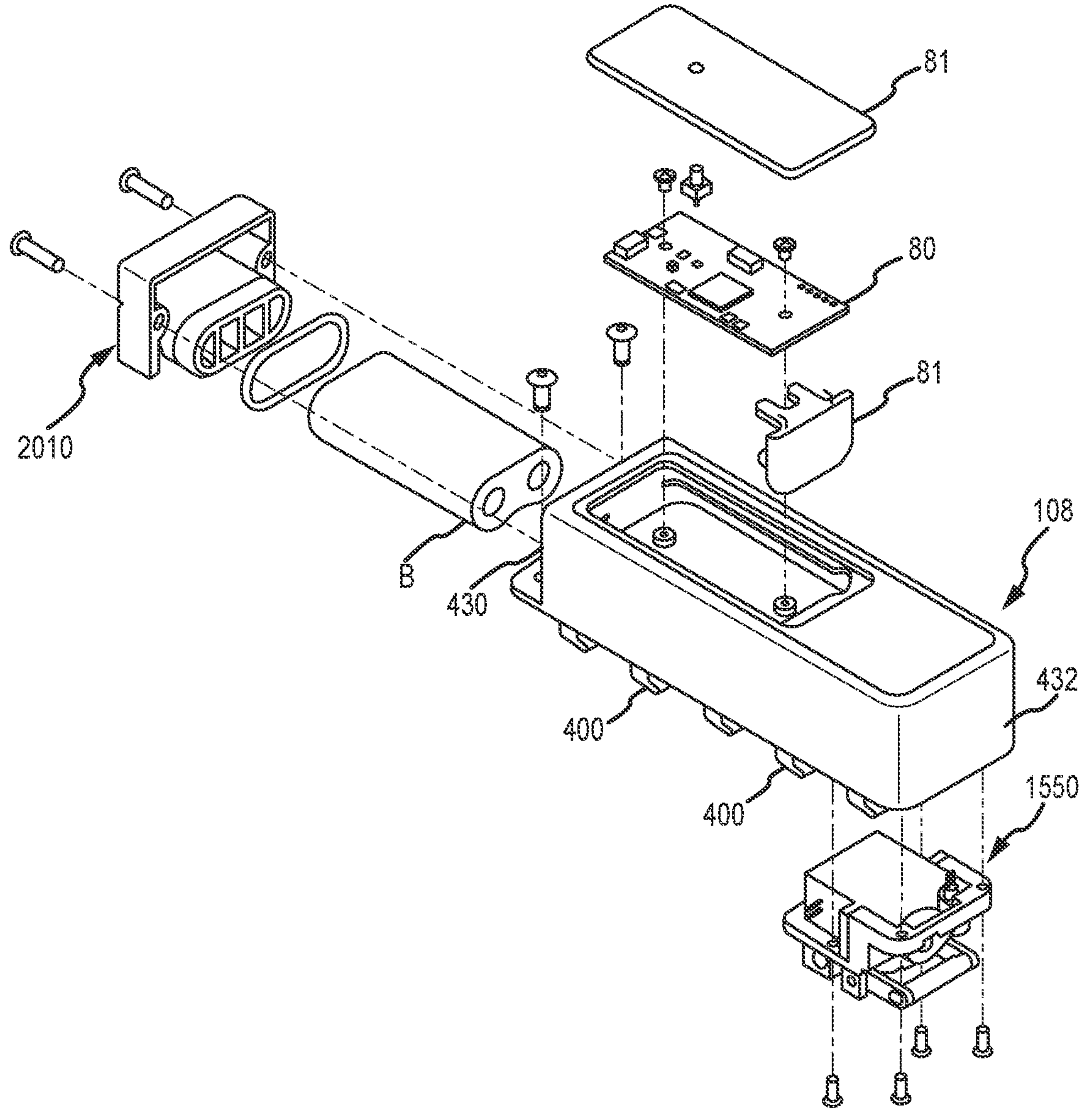
FIG. 28 is an exploded, perspective view of a smart lock according to FIG. 27.

An alternate embodiment is shown in FIGS. 27-29, which shows a lock being used as a stand-alone lock. In this embodiment, the batteries B are again accessible by end cap 2010 at second end 430 of lock 10B. End cap 2010 is removably attached to second end 430 as previously described. The engagement mechanism 1550 (shown in detail in FIG. 29, is self-contained in lock 10B and does not fasten to base plate 2C.

As shown in FIG. 28, lock 10B has a (1) radio frequency window, which has the same function as the previously described RF top plastic cover, (2) circuit board 80, (3) battery contact assembly B1, (4) battery B, (5) end cap 2010, and drive assembly 1550.

Turning to FIG. 29, drive assembly 1550 includes an electric motor 1600, a servo cam 1554, a drive bracket 1558, and an engagement structure 1700. Engagement structure has a first, retracted unlocked position, and a second, extended, locked position. Engagement structure functions in the same manner as previously described engagement structures 500 and 500A except that it has no plate to mount to a base plate. It is self-contained in lock 10B.

Sensors

Sensors that could be used with a lock or system include one or more sensors that detect one or more of (1) locking mechanism opened or locking mechanism closed; (2) engagement structure open or engagement structure closed; (3) vibration/G-force; (4) infrared (IR); (5) location via GPS; (6) asset tracking; and (7) geo-fencing; (8) or any other suitable sensors applicable to the smart lock environment.

The lock could contain or work in conjunction with one or more sensors. In one example, the lock provides its present status or change of status. For example, "lock or latch closed" or "lock or latch opened".

In another example, a lock on a self-storage unit rollup door may have an infrared (IR) sensor that can monitor temperatures inside of the storage unit, either by being in communication with the unit through an opening in the door or having the IR component inside of the unit and communicating with the lock or the system. The measured temperature may indicate a fire, or the presence of a person that gained access to the storage unit without permission.

In another example, the lock or system may include one or more accelerometers that could determine the amount of force striking a rollup door or other locked structure. This could help alert an owner or manager of a possible break-in attempt.

In another example, the lock or system could have a CCD or other camera so that contents of the storage unit could be remotely viewed by either the facility owner or by the individual(s) renting or leasing the locked structure.

In another example, the lock could have sensors to detect particular vapors or chemicals, whereby the sensor could alert the facility owner or the individual(s) renting or leasing the locked structure if a harmful or undesirable vapor or chemical, such as gasoline or chemicals used in illegal drug manufacturing, were detected. In a specific example, someone making methamphetamine in a storage unit could be identified by such a sensor, and the sensor, via the lock or otherwise, would communicate via wired or wireless methods. The examples below include embodiments with sensors.

Electronics and Communications

A lock and system may utilize a (1) one or more RF radio units; (2) a dual RF radio unit; (3) a motor controller circuit; and (4) a low power e, which means that the controller consumes low amounts of power so the battery life is longer.

A lock according to the disclosure can be powered in suitable manner, such as by a battery, batteries, being direct wired to a power source of direct current (DC) or alternating current (AC), by a solar charged power source, or by inductive charging of a power source.

A lock or system may communicate in any suitable manner, such as by (1) BLE Bluetooth low energy; (2) near field communications (NFC); (3) Zigbee; Beacon; and/or (4) Dust Network. The lock can transmit or receive data (a) via traditional communication wire methods, (b) via power wires connected to the lock, wherein the communication packets are carried on the AC or DC line voltage, or (c) by wireless methods such as radio frequency (RF). For example, a lock may include one or more RF radio units.

One RF radio unit of a lower frequency, e.g., about 900 MHz, or about 800 MHz-1,000 MHz, or about 880 MHz to 920 MHz, may be used for carrying larger packets of data and communicating with a host via routers or repeaters (this would typically be the Backhaul unit).

One RF radio unit of a higher frequency, e.g., 2.4 GHz, or about 2.3-2.5 GHz, may be used for communication, such as with smart devices, e.g., cell phones or tablets, within a relatively short range.

The lock or system may have one or more RF radio units of a higher frequency than the others, in order to communicate with a smart device, such as a cell phone or computer, and whereby that smart device communicates and authenticates via a cellular phone network.

The lock may include one or more RF radio units that can link to another radio or radios via a network, whether using a proprietary protocol or using a standard protocol.

The lock may have an RF radio unit that can self-heal based upon other radios in the system. Self-heal means the ability to reroute packets based on known quality RF links within the system. The system establishes this by routing tables and known signal strength.

The lock may have an RF radio unit that will seek other RF radio units in the system to optimize the communication of data to itself or back to a host.

The lock may include at least one of its RF radio units that will seek other radios if its current or primary link to its previously established link is broken.

The lock may have one or more RF radio units that has a guaranteed packet delivery structure, which is a Dust network feature whereby the chip receives confirmation that the packet was delivered.

The lock may have two RF radio units that can be used for additional security or authentication in accessing an area or accessing an asset. For example, in a military depot with thousands of containers stored in close proximity, an attempt to access or open an individual container could require a dual acceptance and approval from both the local host (which could be a database, control center, or centralized database) via a first radio, while a second radio would solicit approval from a separate device (such as a smart device, internet, or other) in order to grant access. If the acceptance criteria are not met by one RF radio unit, the lock would not operate.

The lock may be paired to a smart device, such as a smartphone or tablet, via BlueTooth or Near Field Communication (NFC).

In one example, the lock can be remotely locked or unlocked based on criteria from the host (such as a computer), and the command to unlock may come from an APP, local database, local control center, centralized control center, or the cloud. In another example, the locking device may have fingerprint access.

The lock may communicate with, or is networked with, a host, either via wire or wireless as noted herein; wherein the host can be: (a) a smart device, e.g. a smartphone or tablet; (b) a local database or control center, e.g. the office of a self-storage facility; and (c) a centralized database or control center, e.g. using the "Internet" to coordinate transmitting and receiving data from the lock.

The lock can receive software or firmware updates via wired or wireless methods, or by a hardware port or connector whereby a user or manager can update software or firmware.

Figure 30:
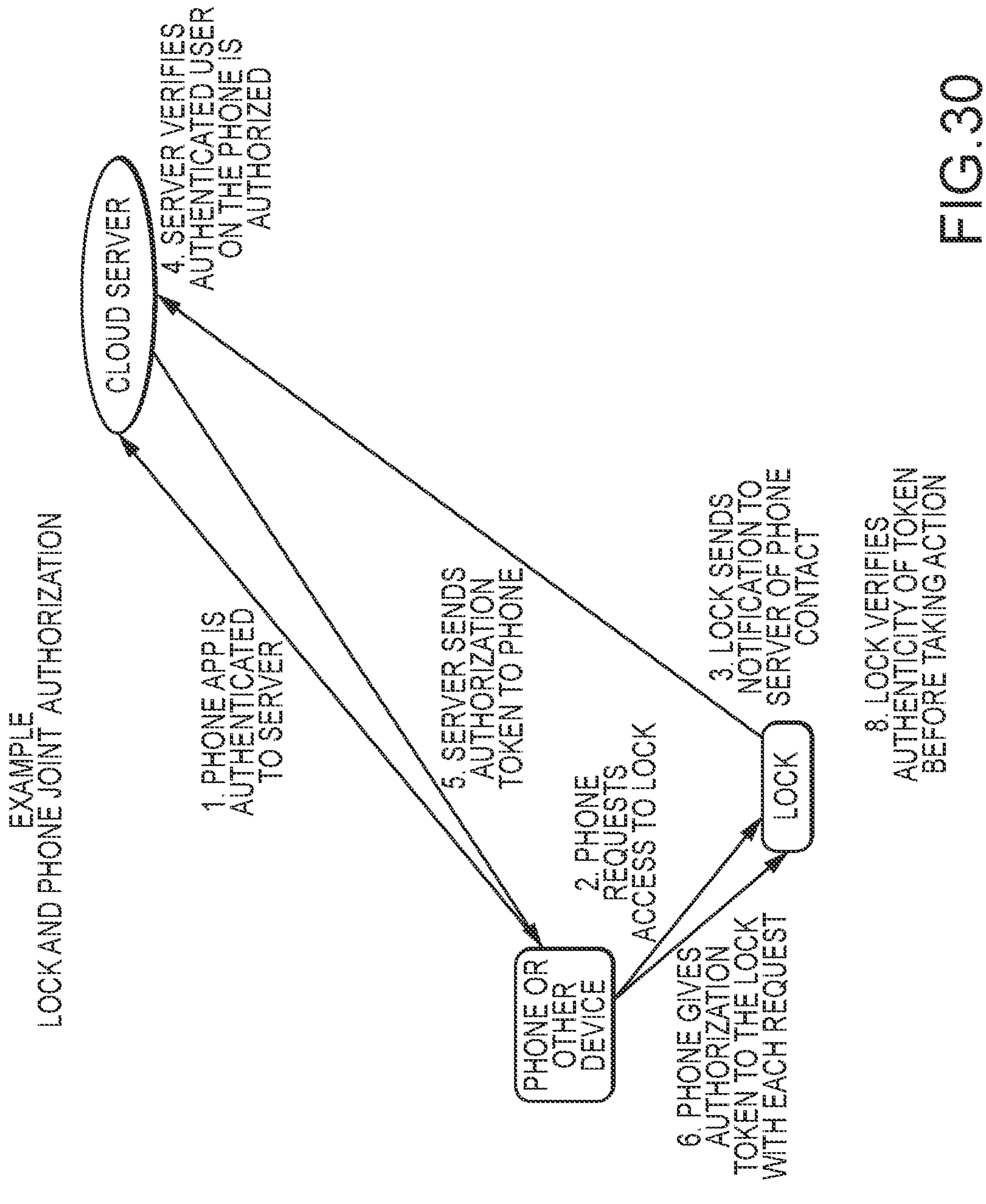
FIG. 30 is a schematic drawing of a method utilizing a lock and an electronic device (showing the example of a cell phone) for joint authorization.
Figure 32:
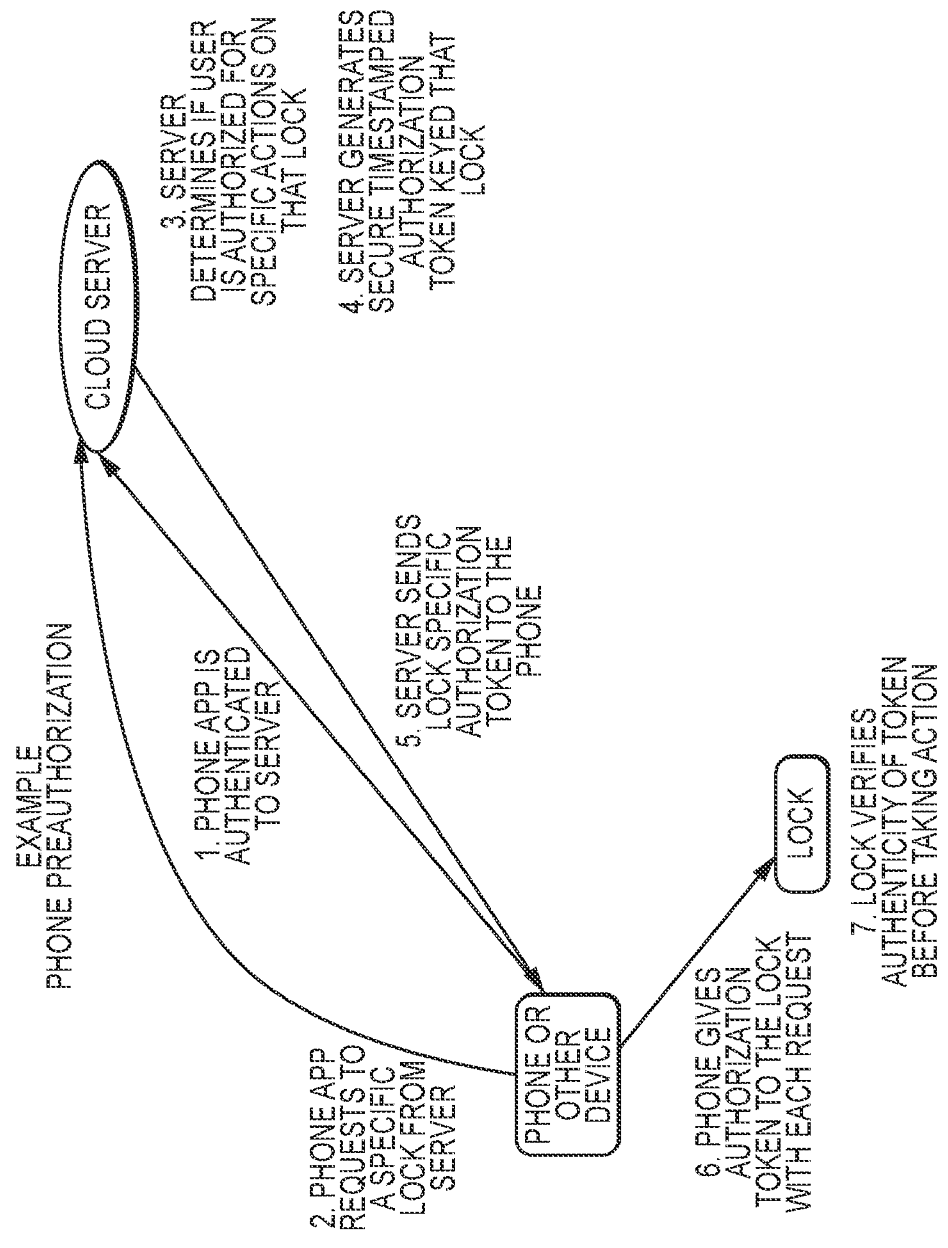
FIG. 32 is a schematic drawing of a method utilizing a lock and an electronic device (showing the example of a cell phone) for device preauthorization.
Figure 33:
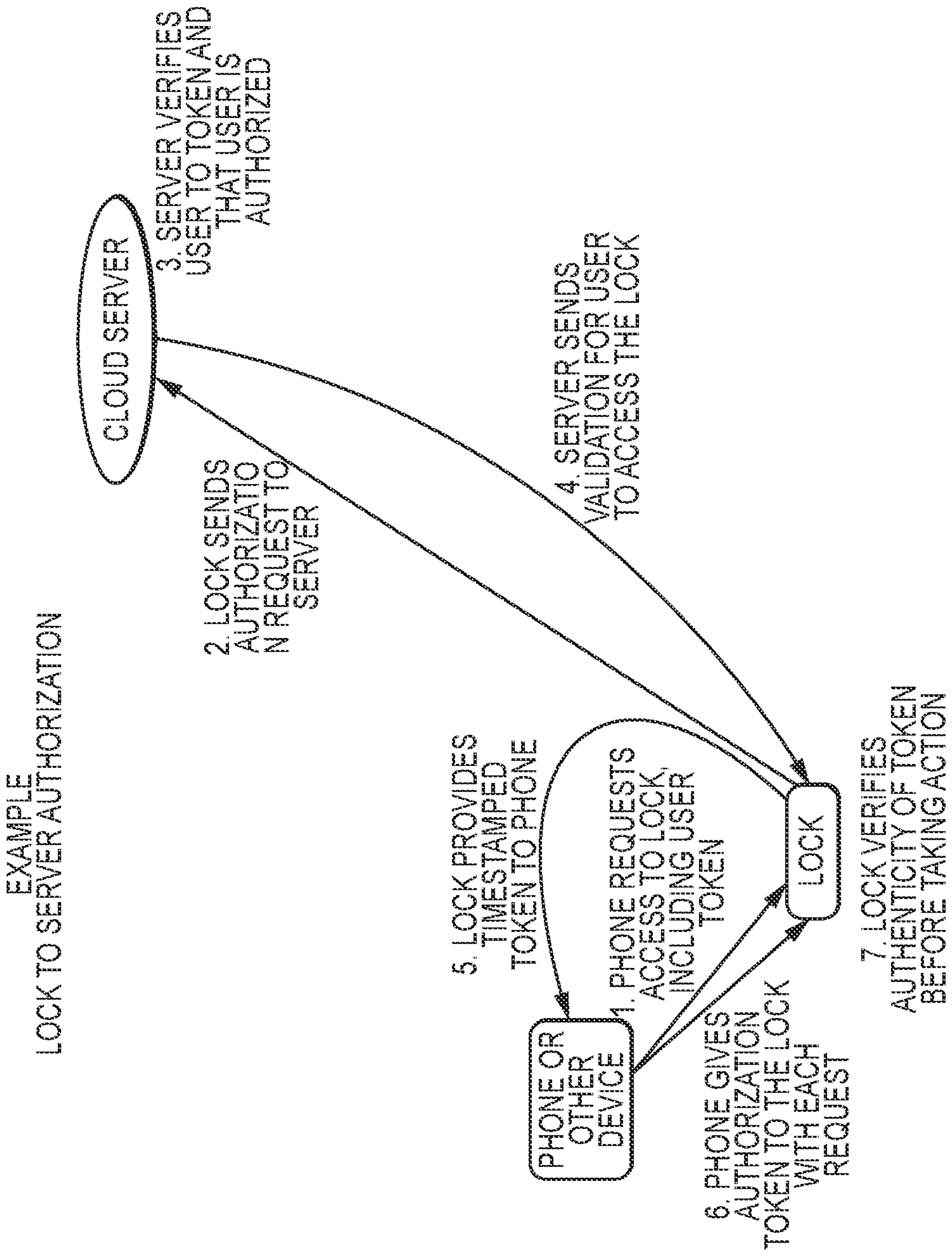
FIG. 33 is a schematic drawing of a method utilizing a lock and an electronic device (showing the example of a cell phone) for lock to server authorization.
Figure 34:
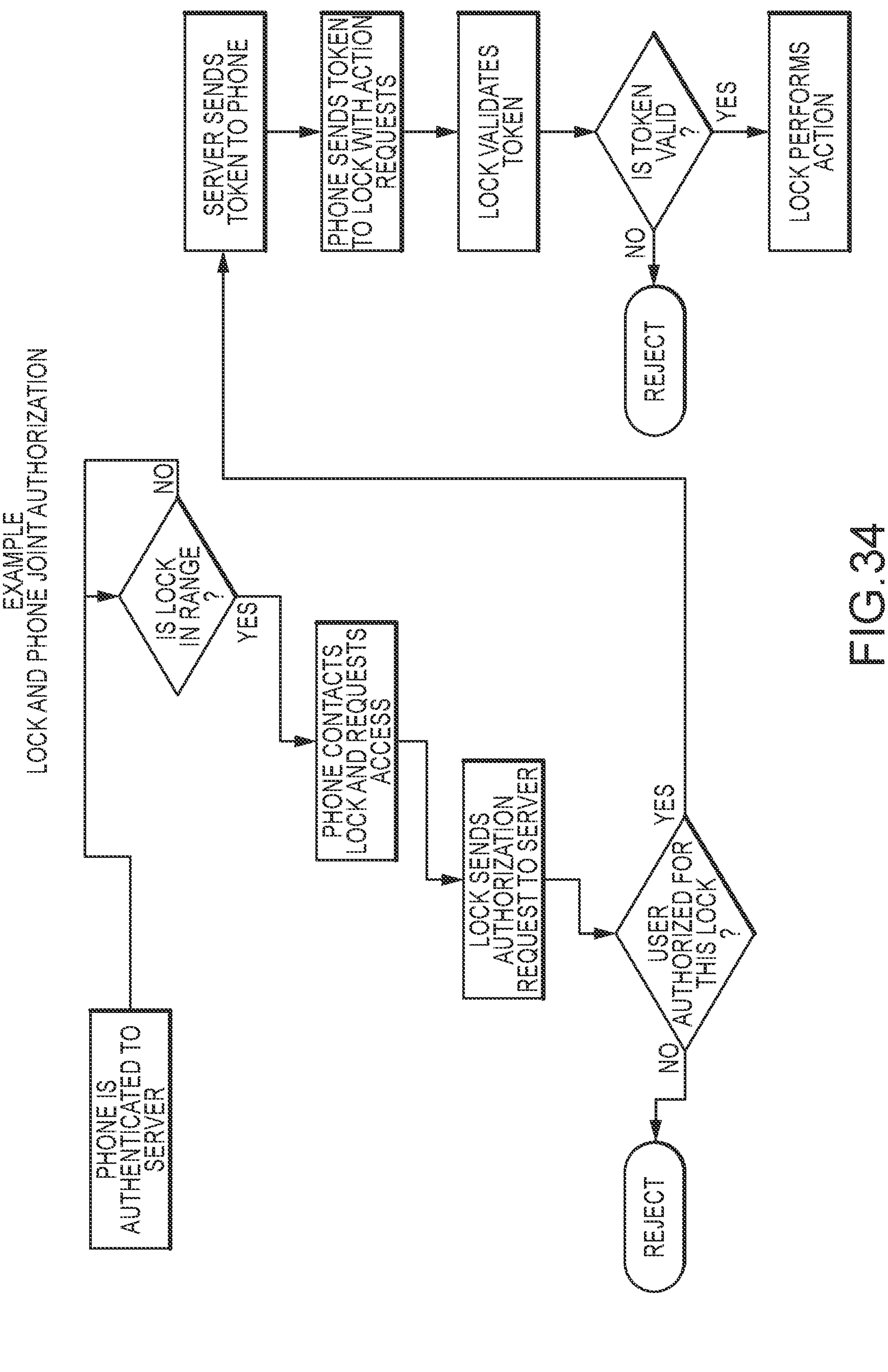
FIG. 34 is a flow chart of logic steps (of FIG. 30) for a lock and an electronic device (showing the example of a cell phone) for joint authorization.

Some exemplary methods of implementing a system including a plurality of locks are shown in FIGS. 30-38. FIGS. 30 and 34 show a method of operating an electric lock that includes the following steps:

(a) a user contacting a lock-control server;
(b) the server authenticating the user:
(c) the user requesting access to a lock having a radio;
(d) the lock radio sending a query to the server with the user information;
(e) the server verifying that the user is permitted to access the lock, or denying access to the lock;
(f) if access to the lock is permitted, the server sending the user an authorization token;
(g) the user sending the authorization token to the lock;
(h) the lock verifying the authenticity of the token and locking or unlocking if the token is authenticated.

Figure 31:
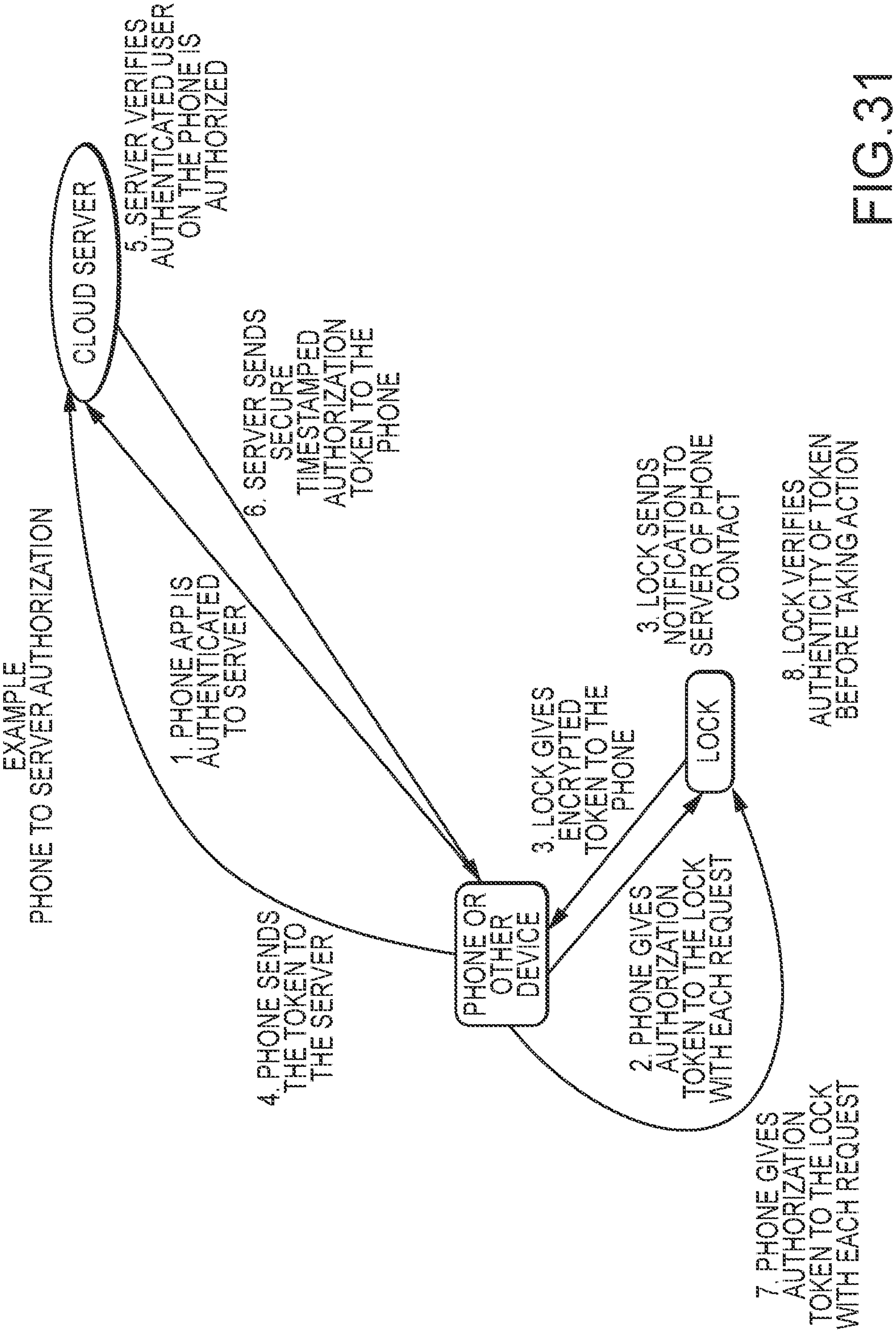
FIG. 31 is a schematic drawing of a method utilizing a lock and an electronic device (showing the example of a cell phone) for device to server authorization.
Figure 35:
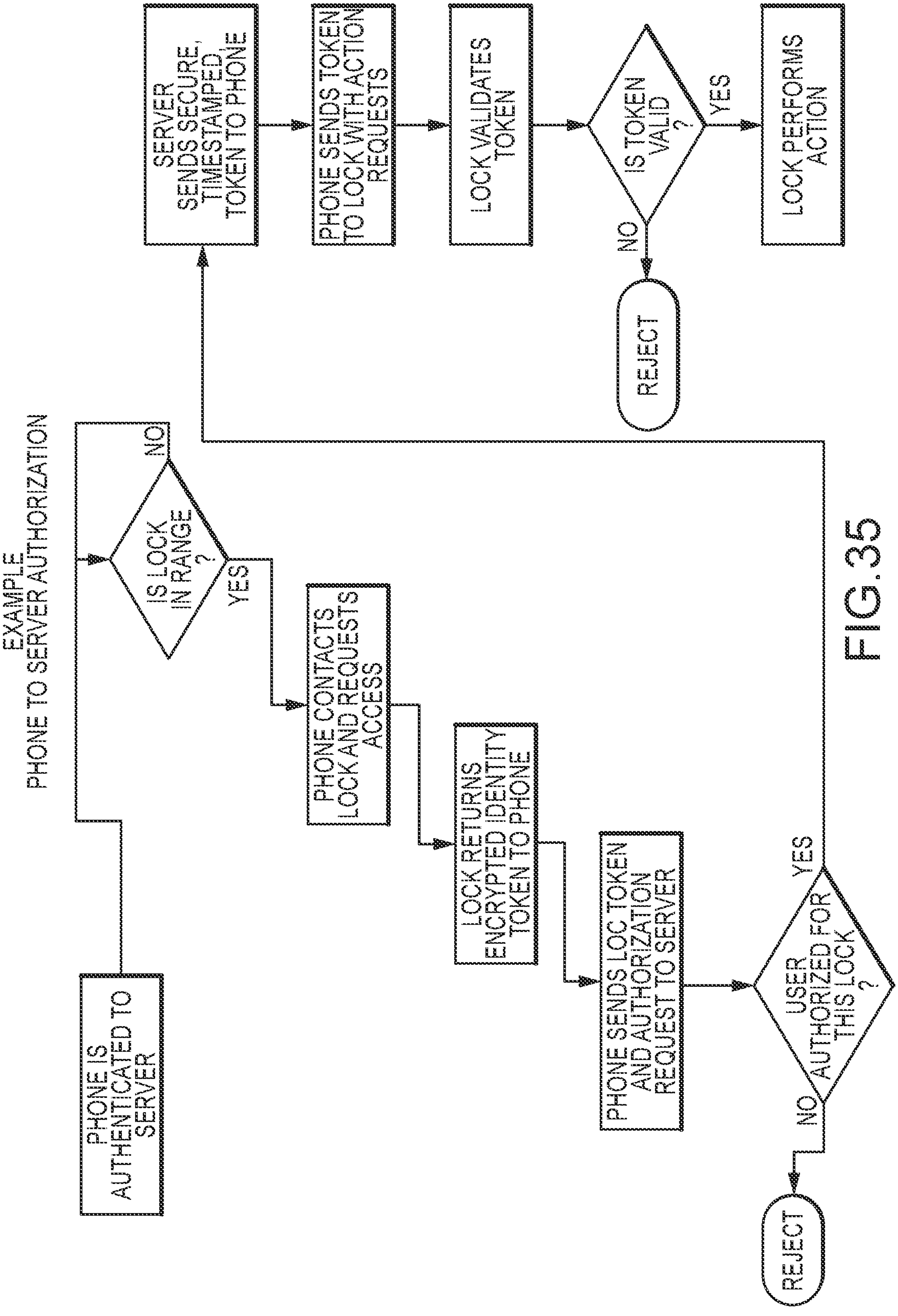
FIG. 35 is a flow chart of logic steps (of FIG. 31) for a lock and electronic device (showing the example of a cell phone) for device to server authorization.

FIGS. 31 and 35 show a method of operating an electric lock that includes the following steps:

(a) a user contacting a lock-control server;
(b) the server authenticating the user:
(c) the user requesting access to a lock having a radio;
(d) the lock radio sending the user a token;
(e) the user sending the token to the server;
(f) the server verifying the user is permitted to access the lock, or denying access to the lock;
(g) if access to the lock is permitted, the server sending the user an authorization token;
(h) the user sending the authorization token to the lock;
(i) the lock verifying the authenticity of the token and locking or unlocking if the token is authenticated.

Figure 36:
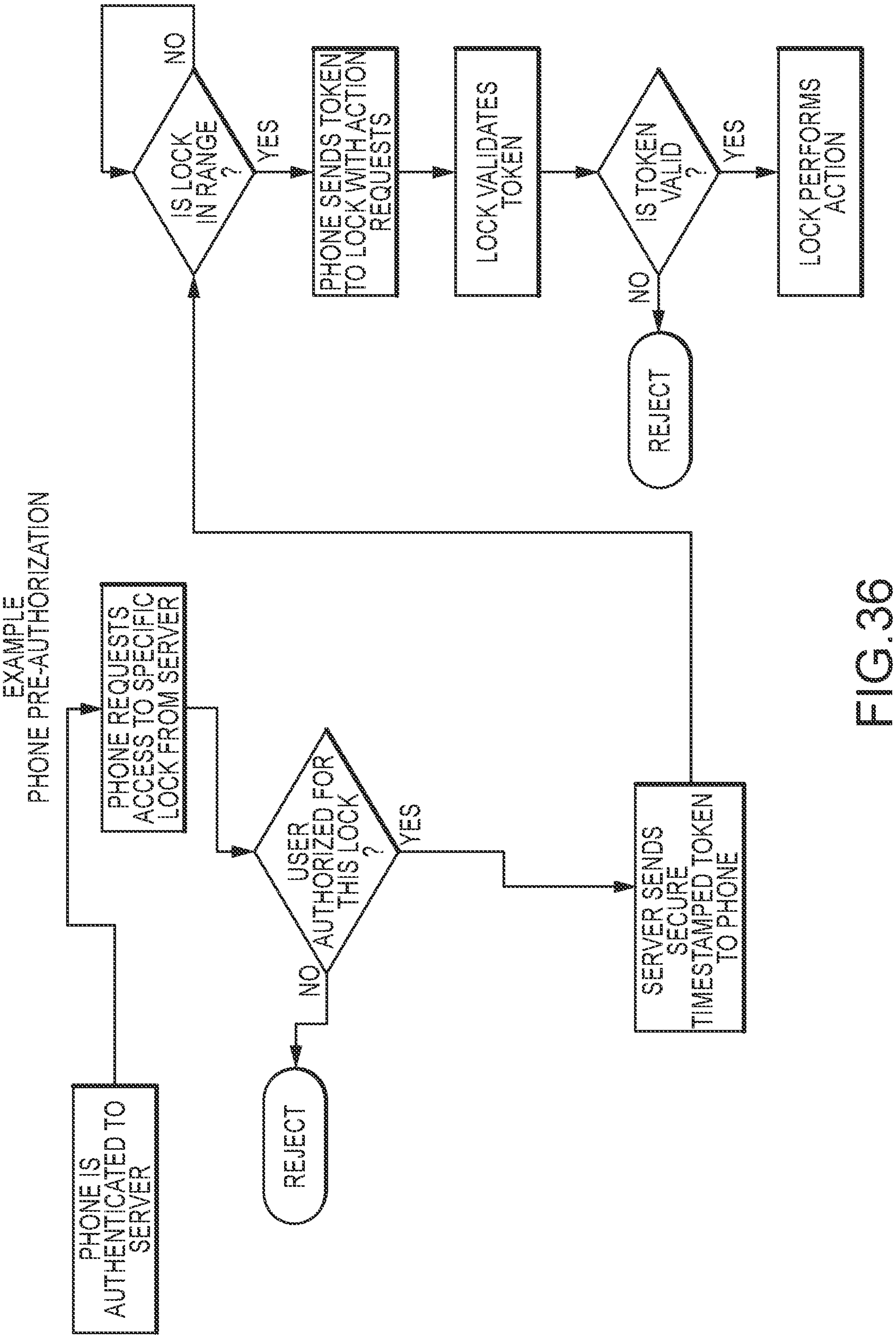
FIG. 36 is a flow chart of logic steps (of FIG. 32) for a lock and electronic device (showing the example of a cell phone) for device preauthorization.

FIGS. 32 and 36 show a method of operating an electric lock that includes the following steps:

(a) a user contacting a lock-control server;
(b) the server authenticating the user:
(c) the user requesting the server access to a lock having a radio;
(d) the server determining if the user is authorized to have access to the lock;
(e) the server verifying the user is permitted to access the lock, or denying access to the lock;
(f) if access to the lock is permitted, the server sending the user an authorization token;
(g) the user sending the authorization token to the lock;
(h) the lock verifying the authenticity of the token and locking or unlocking if the token is authenticated.

Figure 37:
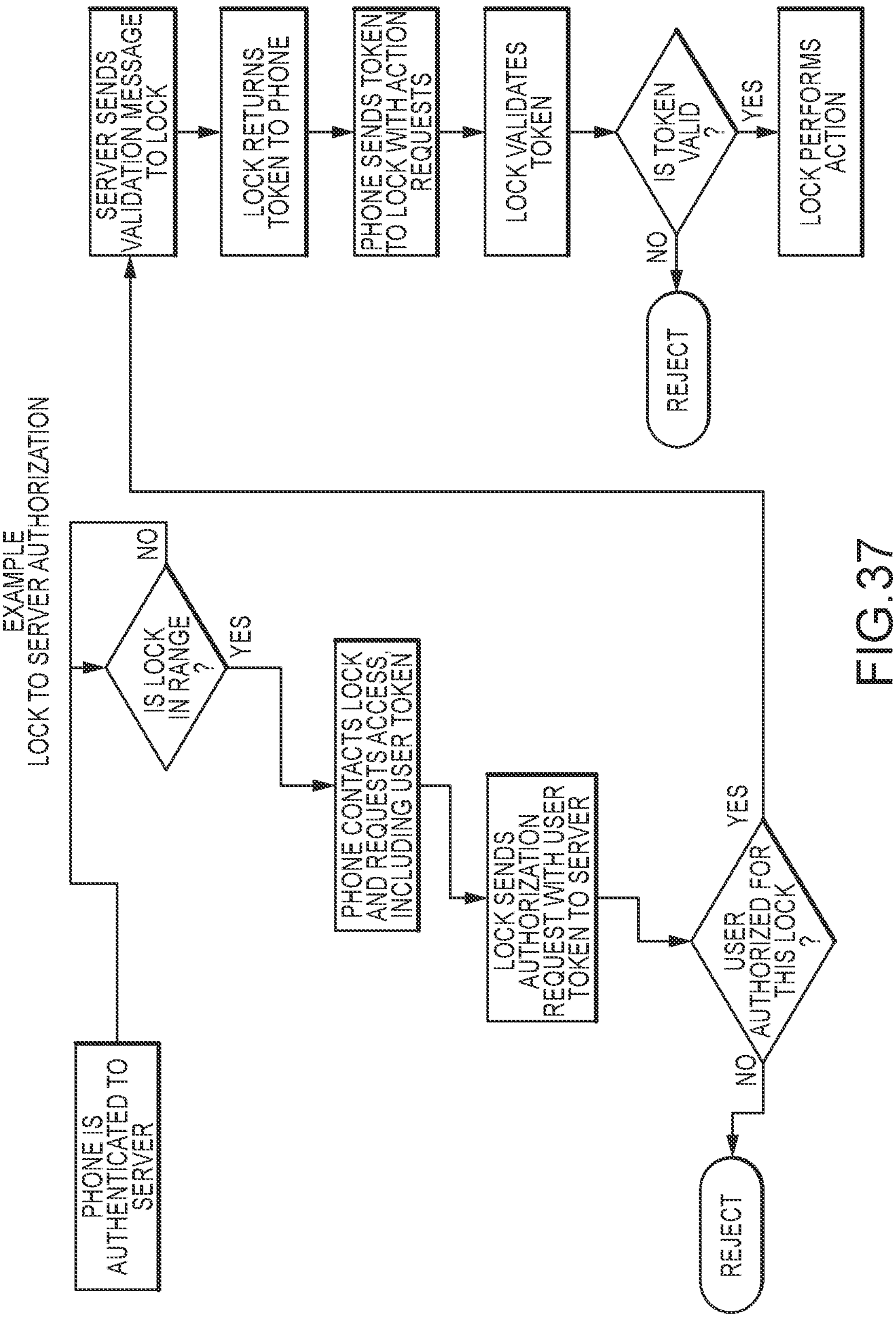
FIG. 37 is a flow chart of logic steps (of FIG. 33) for a lock and electronic device (showing the example of a cell phone) for lock to server authorization.

FIGS. 33 and 37 show a method of operating an electric lock that includes the following steps:

(a) a user contacting a lock to request access to the lock providing the lock with a user token;
(b) the lock sending an authorization request to a lock server;
(c) the server authenticating the token and that the user is authorized:
(d) the server verifying the user is permitted to access the lock, or denying access to the lock;
(e) if access to the lock is permitted, the server sending the lock an authorization token specific to the user;
(f) if access to the lock is permitted, the server sending the user an authorization token specific to the lock;
(g) the user sending the authorization token specific to the lock to the lock;
(h) the lock verifying the authenticity of the token and locking or unlocking if the token is authenticated.

Figure 38:
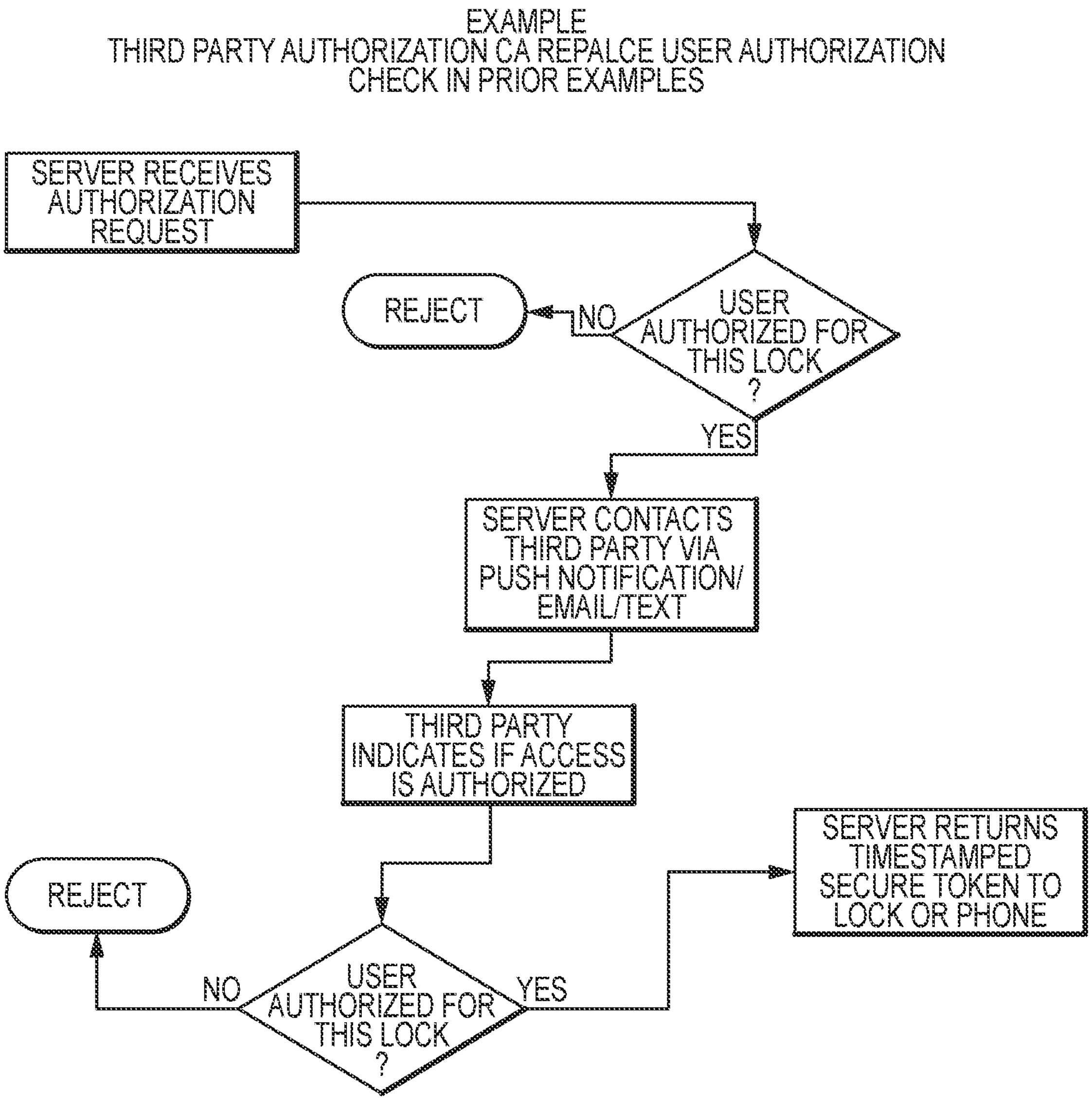
FIG. 38 is a flow chart of logic steps for a third-party authorization that can replace user authorization.

FIG. 38 shows a method of operating an electric lock that includes the following steps:

(a) a user contacting a lock-control server;
(b) the server authenticating the user:
(c) the user requesting access to a lock having a radio;
(d) the lock radio sending a query to the server with the user information;
(e) the server verifying that the user is permitted to access the lock, or denying access to the lock;
(f) if access to the lock is permitted, the server sending the user an authorization token;
(g) the user sending the authorization token to the lock;
(h) the lock verifying the authenticity of the token and locking or unlocking if the token is authenticated.

Any of the methods herein could further include (1) the step of the lock opening, (2) the step of the user communicating with the lock and the server by using a cell phone or a computer, (3) the server being a cloud server, (4) the token including a time during which the user is authorized to operate the lock, (5) the step of the server determining if the lock is within a predetermined range, or (6) the step of the server contacting a third party.

Some exemplary non-limiting embodiments of the disclosure are set forth below:

Example 1: A lock comprising an engagement structure configured to engage an opening in a locking mechanism, wherein the lock comprises (a) a body; and (b) an engagement structure positioned at least partially in the body, the engagement structure having a first position in which it engages the locking mechanism and a second position in which it does not engage the locking mechanism.

Example 2: The lock of example 1, wherein the locking mechanism includes an opening configured to retain a leg of the engagement structure.

Example 3: The lock of any of examples 1-2, wherein the leg has a side that is curved or angled.

Example 4: The lock of any of examples 1-3, wherein the engagement structure is biased to the first position or to the second position.

Example 5: The lock of example 4, wherein the engagement structure is biased by a spring.

Example 6: The lock of any of examples 1-5 that further includes an electric motor, and wherein the engagement structure can be moved between its first position and its second position by the electric motor.

Example 7: The lock of example 6, wherein the motor is directly or indirectly connected to the engagement structure.

Example 8: The lock of any of examples 1-7 that further incudes a pivot rod around which the engagement structure pivots from its first position to its second position and its second position to its first position.

Example 9: The lock of any of examples 1-8, wherein the engagement structure is biased to the second position.

Example 10: The lock of example 9 that further includes an electric motor configured to bias the engagement structure to the second position.

Example 11: The lock of any of examples 1-9, wherein the locking mechanism is a sliding bar that is movable between a first, unlocked position to a second, locked position.

Example 12: The lock of any of examples 1-2 or 4-11, wherein the engagement structure is a dowel pin.

Example 13: The lock of example 12, wherein the dowel pin is vertically oriented inside of the body.

Example 14: The lock of any of examples 1-13, wherein the engagement structure is fully inside the body when in its first position and partially inside of the body when in its second position.

Example 15: The lock of any of examples 1-14 that further includes a base plate to which the body is connected.

Example 16: The lock of example 15, wherein the base plate has a top side to which the body is connected and a bottom side, and the locking mechanism is positioned primarily on the bottom side.

Example 17: The lock of any of examples 15-16, wherein the base plate has an opening through which the locking mechanism can be accessed.

Example 18: The lock of example 17, wherein the locking mechanism is a sliding bar.

Example 19: The lock of example 18, wherein the sliding bar further comprises an outwardly-extending tab that extends past the opening and is configured to be manually gripped by an operator in order to move the sliding bar.

Example 20: The lock of any of examples 1-19, wherein the second side of the base plate includes one or more structures configured to space the base plate from a structure to which the base plate is mounted.

Example 21: The lock of example 19, wherein the outwardly-extending tab is formed at a 90° angle from the sliding bar.

Example 22: The lock of any of examples 19-21, wherein the outwardly-extending tab includes an opening configured to receive the arm of a padlock.

Example 23: The lock of any of examples 1-23, wherein the engagement structure is mounted directly to the base plate.

Example 24: The lock of example 23, wherein the engagement structure is mounted directly to the base plate by one or more fasteners.

Example 25: The lock of example 24, wherein the engagement structure includes a support plate that rests on the base plate.

Example 26: The lock of any of examples 1-23, wherein the engagement structure is not mounted directly to the base plate.

Example 27: The lock of any of examples 1-26 that has fingerprint access.

Example 28: The lock of any of examples 1-27 that has an overlock feature.

Example 29: The lock of any of examples 1-28 that further includes an access lock on the body, wherein the access lock can be removed to expose an inner cavity of the body.

Example 30: The lock of example 29 that further includes a fastener that connects the body to the base plate, wherein the fastener is accessible in the inner cavity and can be removed to remove the body from the base plate.

Example 31: The lock of any of examples 1-30 that further includes a secondary manual lock that has a second engagement member configured to engage the locking mechanism.

Example 32: The lock of any of examples 1-31 that further includes a receiver configured to receive electronic signals.

Example 33: The lock of any of examples 1-32 that further includes a transmitter for sending electronic signals.

Example 34: The lock of example 32, wherein the receiver is a radio.

Example 35: The lock of example 33, wherein the transmitter is a radio.

Example 36: The lock of any of examples 1-35 that further includes a power source.

Example 37: The lock of example 36, wherein the power source is one or more batteries.

Example 38: The lock of any of examples 1-37, wherein the lock body has a first end and second end and an end cap on the first end or the second end.

Example 39: The lock of example 38, wherein the end cap is connected to the body by one or more fasteners.

Example 40: The lock of example 38 or 39, wherein the end cap has a first position in which it is connected to the body by the one or more fasteners, and a second position in which it is removed from the body and the inner cavity of the body is exposed, whereby batteries can be removed and/or added to the inner cavity when the end cap is removed.

Example 41: The lock of any of examples 1-40 that can communicate on multiple radio frequencies.

Example 42: The lock of example 41, wherein the lock can operate at either 2.4 GHz or 900 MHz or both.

Example 43: The lock of example 41 that comprises multiple radios, wherein each radio operates on a different frequency.

Example 44: The lock of example 42 or 43 that includes at least one radio operating at 2.4 GHz and at least one radio operating at 900 MHz.

Example 45: The lock of any of examples 1-44 that is configured to be mounted to a structure without the need to enter or open the structure.

Example 46: The lock of example 45, wherein the structure is a self-storage unit.

Example 47: The lock of any of examples 1-46 that includes a backhaul unit to interface with the lock and/or with a central controller, such as a computer.

Example 48: The lock of any of examples 1-47 that meshes to a backhaul unit via RF communications at 2.4 GHz.

Example 49: The lock of any of examples 1-48, wherein there is a plurality of backhaul units and the backhaul units communicate with each other via RF transmissions at 900 MHz or by power-over-ethernet.

Example 50: The lock of any of examples 1-49, wherein there is at least one backhaul unit that communicates with a central controller either via a radio signal at 900 MHz or via power-over-ethernet.

Example 51: The lock of any of examples 1-50 that is configured to communicate via RF technology, an AC wired connection, a DC wired connection, power-over-ethernet, or through a backhaul unit.

Example 52: The lock of any of examples 1-51 that further includes one or more sensors, wherein the one or more sensors are one or more of: (a) a temperature sensor (such as an infrared detector, a thermistor, a thermocouple, or a laser); (b) a water sensor (such as a hygrometer or floor-leak sensor); (c) a chemical sensor (such as a smoke detector, CO sensor, $CO_2$ sensor, $O_3$ sensor, $NO_x$ sensor, $H_2S$ sensor, or methane sensor), (d) an environmental sensor (such as to measure air pollution, gas, $O_3$, methane or other gases), (e) a pressure sensor (such as a barometer or tactile sensor), and (f) a proximity sensor (such as an alarm, motion sensor, or infrared sensor).

Example 53: The lock of any of examples 1-52 that is configured to communicate with any of the sensors listed in example 51.

Example 54: The lock of example 53, wherein the sensors are remote from the lock.

Some further, non-limiting examples of the invention are as follows:

Example 1: A lock that is powered by one or more of a battery, wired electrical power, solar charging, or inductive charging.

Example 2: The lock of example 1 that can transmit or receive data via a (a) wired connection, (b) a power wire, where the communication packets are carried on an AC line voltage, or (c) wireless radio frequency protocol.

Example 3: The lock of example 1 that further includes one or more RF radio units.

Example 4: The lock of example 3 that has a plurality of RF radio units, wherein at least one RF radio unit operates at a lower frequency than the other of the plurality of RF radio units.

Example 5: The lock of example 4, wherein the at least one RF radio unit operating at a lower frequency operates at about 900 MHz.

Example 6: The lock of example 3 or 4, wherein the at least one RF radio unit operating at a lower frequency is configured to carry larger packets of data and communicate with a host via routers or repeaters.

Example 7: The lock of any of examples 3-6 that further includes one RF radio unit configured to operate at a higher frequency.

Example 8: The lock of example 7, wherein the RF radio unit configured to operate at a higher frequency operates at about 2.4 GHz for communication with smart devices such as a cell phone.

Example 9: The lock of example 7 or 8, wherein one or more RF radio units of a higher frequency communicates with a smart device, and wherein the smart device communicates and authenticates via a cellular phone network.

Example 10: The lock of any of examples 3-9, wherein one or more RF radio units can link to one or more radio units via a network, whether using a proprietary protocol or using a standard protocol.

Example 11: The lock of example 10, wherein the one or more radio units can self-heal based upon other RF radio units in a system.

Example 12: The lock of any of examples 3-11, wherein the one or more RF radio units will seek other RF radio units in the system to optimize the communication of data to itself or back to a host.

Example 13: The lock of any of examples 3-12, wherein the one or more RF radio units will seek other RF radio units if its current and primary link to its previously established link is broken.

Example 14: The lock of any of examples 3-13, wherein the one or more RF radio units has a guaranteed packet delivery structure.

Example 15: The lock of any of examples 3-14, wherein two RF radio units can be used for additional security or authentication in accessing an area or accessing an asset.

Example 16: The lock of example 15, wherein the asset is a military depot with thousands of containers stored in close proximity.

Example 17: The lock of any of examples 1-16 that requires approval from both the local host (database, control center, or centralized database) via a Radio #1, while a Radio #2 solicits approval from a separate entity (such as smart device, Cloud, or other) in order to grant access.

Example 18: The lock of any of examples 1-17 that can be paired to a smart device, e.g. to a smartphone, via BlueTooth or NFC Near Field Communication.

Example 19: The lock of any of examples 1-18 that is configured to communicate with or is networked with a host, either via wire or wireless as noted elsewhere; wherein the host can be:

(a) a smart device near the locking device, e.g. a smartphone or tablet;

(b) a local database or control center, e.g. the office of a self-storage facility; or (c) a centralized database or control center, e.g. using the "cloud" to coordinate transmitting and receiving data from the locking device.

Example 20: The lock of any of examples 1-19 that can receive software or firmware updates via wired or wireless methods, or by a hardware port or connector whereby a user can update software or firmware.

Example 21: The lock of any of examples 1-20 that contains one or more sensors.

Example 22: The lock of example 20, wherein the one or more sensors are one or more of: (a) an infrared (IR) sensor; (b) one or more accelerometers; (c) a CCD or other camera; and (d) one or more chemical sensors.

Example 23: The lock of any of examples 1-22 that transmits its present status or change of status of 'lock or latch closed' or 'lock or latch opened', Example 24: The lock of any of examples 1-23 that can be remotely locked or unlocked based on criteria from the host.

Example 25: The lock of example 24, wherein the host is an APP, local database, local control center, centralized control center, or cloud.

Example 26: The lock of any of examples 1-25 that has fingerprint access.

Example 27: The lock of any of examples 1-26 that has an overlock feature.

Example 28: The lock of any of examples 1-27 that further includes an access lock on the body, wherein the access lock can be removed to expose an inner cavity of the body.

Example 29: The lock of example 28 that further includes a fastener that connects the body to the base plate, wherein the fastener is accessible in the inner cavity and can be removed to remove the body from the base plate.

Example 30: The lock of any of examples 1-29 that further includes a secondary manual lock that has a second engagement member configured to engage the locking mechanism.

Example 31: The lock of any of examples 1-30 that further includes a receiver configured to receive electronic signals.

Example 32: The lock of any of examples 1-31 that further includes a transmitter for sending electronic signals.

Example 33: The lock of example 31, wherein the receiver is a radio.

Example 34: The lock of example 32, wherein the transmitter is a radio.

Example 35: The lock of any of examples 1-34 that further includes a power source.

Example 36: The lock of example 35, wherein the power source is one or more batteries.

Example 37: The lock of any of examples 1-36, wherein the lock body has a first end and second end and an end cap on the first end or the second end.

Example 38: The lock of example 37, wherein the end cap is connected to the body by one or more fasteners.

Example 39: The lock of example 38, wherein the end cap has a first position in which it is connected to the body by the one or more fasteners, and a second position in which it is removed from the body and the inner cavity of the body is exposed, whereby batteries can be removed and/or added to the inner cavity when the end cap is removed.

Example 40: The lock of any of examples 1-39 that can communicate on multiple radio frequencies.

Example 41: The lock of example 40, wherein the lock can operate at either 2.4 GHz or 900 MHz or both.

Example 42: The lock of example 40 that comprises multiple radios, wherein each radio operates on a different frequency.

Example 43: The lock of example 41 or 42 that includes at least one radio operating at 2.4 GHz and at least one radio operating at 900 MHz.

Example 44: The lock of any of examples 1-43 that is configured to be mounted to a structure without the need to enter or open the structure.

Example 45: The lock of example 44, wherein the structure is a self-storage unit.

Example 46: The lock of any of examples 1-45 that includes a backhaul unit to interface with the lock and/or with a central controller, such as a computer.

Example 47: The lock of any of examples 1-46 that meshes to a backhaul unit via RF communications at 2.4 GHz.

Example 48: The lock of any of examples 1-47, wherein there is a plurality of backhaul units and the backhaul units communicate with each other via RF transmissions at 900 MHz or by power-over-ethernet.

Example 49: The lock of any of examples 1-48, wherein there is at least one backhaul unit that communicates with a central controller either via a radio signal at 900 MHz or via power-over-ethernet.

Example 50: The lock of any of examples 1-49 that is configured to communicate via RF technology, an AC wired connection, a DC wired connection, power-over-ethernet, or through a backhaul unit.

Example 51: The lock of any of examples 1-50 that further includes one or more sensors, wherein the one or more sensors are one or more of: (a) a temperature sensor (such as an infrared detector, a thermistor, a thermocouple, or a laser); (b) a water sensor (such as a hygrometer or floor-leak sensor); (c) a chemical sensor (such as a smoke detector, CO sensor, $CO_2$ sensor, $O_3$ sensor, $NO_x$ sensor, $H_2S$ sensor, or methane sensor), (d) an environmental sensor (such as to measure air pollution, gas, $O_3$, methane or other gases), (e) a pressure sensor (such as a barometer or tactile sensor), and (f) a proximity sensor (such as an alarm, motion sensor, or infrared sensor).

Example 52: The lock of any of examples 1-51 that is configured to communicate with any of the sensors listed in example 51.

Example 53: The lock of example 52, wherein the sensors are remote from the lock.

Example 54: The lock of example 51, wherein each of the one or more sensors can be removed and/or replaced with other sensors.

Some other, non-limiting examples of the invention follows:

Example 1: A method of operating an electric lock, the method comprising the steps of:

(a) a user contacting a lock-control server;
(b) the server authenticating the user:
(c) the user requesting access to a lock having a radio;
(d) the lock radio sending a query to the server with the user information;
(e) the server verifying that the user is permitted to access the lock, or denying access to the lock;
(f) if access to the lock is permitted, the server sending the user an authorization token;
(g) the user sending the authorization token to the lock;
(h) the lock verifying the authenticity of the token and locking or unlocking if the token is authenticated.

Example 2: The method of example 1 that further includes the step of the lock opening.

Example 3: The method of example 1 or example 2, wherein the user communicates with the lock and the server by using a cell phone or a computer.

Example 4: The method of any of examples 1-3, wherein the server is a cloud server.

Example 5: A method of operating an electric lock, the method comprising the steps of:

(a) a user contacting a lock-control server;
(b) the server authenticating the user:
(c) the user requesting access to a lock having a radio;
(d) the lock radio sending the user a token;
(e) the user sending the token to the server;
(f) the server verifying the user is permitted to access the lock, or denying access to the lock;
(g) if access to the lock is permitted, the server sending the user an authorization token;
(h) the user sending the authorization token to the lock;
(i) the lock verifying the authenticity of the token and locking or unlocking if the token is authenticated.

Example 6: The method of example 5 that further includes the step of the lock opening.

Example 7: The method of example 5 or example 6, wherein the user communicates with the lock and the server by using a cell phone or a computer.

Example 8: The method of any of examples 5-7, wherein the server is a cloud server.

Example 9: A method of operating an electric lock, the method comprising the steps of:

(a) a user contacting a lock-control server;
(b) the server authenticating the user:
(c) the user requesting the server access to a lock having a radio;
(d) the server determining if the user is authorized to have access to the lock;
(e) the server verifying the user is permitted to access the lock, or denying access to the lock;
(f) if access to the lock is permitted, the server sending the user an authorization token;
(g) the user sending the authorization token to the lock;
(h) the lock verifying the authenticity of the token and locking or unlocking if the token is authenticated.

Example 10: The method of example 9 that further includes the step of the lock opening.

Example 11: The method of example 9 or example 10, wherein the user communicates with the lock and the server by using a cell phone or a computer.

Example 12: The method of any of examples 9-11, wherein the server is a cloud server.

Example 13: A method of operating an electric lock, the method comprising the steps of:

(a) a user contacting a lock to request access to the lock providing the lock with a user token;
(b) the lock sending an authorization request to a lock server;
(c) the server authenticating the token and that the user is authorized:
(d) the server verifying the user is permitted to access the lock, or denying access to the lock;
(e) if access to the lock is permitted, the server sending the lock an authorization token specific to the user;

(f) if access to the lock is permitted, the server sending the user an authorization token specific to the lock;

(g) the user sending the authorization token specific to the lock to the lock;

(h) the lock verifying the authenticity of the token and locking or unlocking if the token is authenticated.

Example 14: The method of example 13 that further includes the step of the lock opening.

Example 15: The method of example 13 or example 14, wherein the user communicates with the lock and the server by using a cell phone or a computer.

Example 16: The method of any of examples 13-15, wherein the server is a cloud server.

Example 17: A method of operating an electric lock, the method comprising the steps of:

(a) a user contacting a lock-control server;

(b) the server authenticating the user:

(c) the user requesting access to a lock having a radio;

(d) the lock radio sending a query to the server with the user information;

(e) the server verifying that the user is permitted to access the lock, or denying access to the lock;

(f) if access to the lock is permitted, the server sending the user an authorization token;

(g) the user sending the authorization token to the lock;

(h) the lock verifying the authenticity of the token and locking or unlocking if the token is authenticated.

Example 18: The method of example 1 that further includes the step of the lock opening.

Example 19: The method of example 1 or example 2, wherein the user communicates with the lock and the server by using a cell phone or a computer.

Example 20: The method of any of examples 1-3, wherein the server is a cloud server.

Example 21: The method of any of examples 1-20, wherein the token includes a time during which the user is authorized to operate the lock.

Example 22: The method of any of examples 1-21 that further includes the step of the server determining if the lock is within a predetermined range.

Example 23: The method of any of examples 1-22 that further includes the step of the server contacting a third party.

Some other, non-limiting examples of this disclosure follows:

Example 1: A locking system comprising:

(a) a primary lock that includes a primary locking mechanism moveable between a first, open position and a second, locked position; and (b) an overlock that includes an overlock locking mechanism moveable between a first position in which it does not contact the primary locking mechanism, and a second position in which it contacts the primary locking mechanism and prevents the primary locking mechanism from moving from the second, locked position to the first, open position.

Example 2: The locking system of example 1, wherein the primary locking structure and the overlock locking structure are attached.

Example 3: The locking system of example 1 or example 2, wherein the primary locking structure is a sliding bar and the overlock locking structure is a sliding bar.

Example 4: The locking system of example 3, wherein the primary locking structure has a first end proximal the overlock and a second end distal the overlock, and a raised tab at the first end, and the overlock locking structure has a first end proximal the primary lock and a second end distal the primary lock, and a raised tab at the first end.

Example 5: The locking system of example 4, wherein the raised tab of the overlock locking structure is attached to the raised tab of the primary locking structure.

Example 6: The locking system of any of examples 1-5 that further includes a space between the primary lock and the overlock and the primary lock has a housing and the overlock has a housing, and the primary locking mechanism extends from the primary lock housing and into the space, and the overlock locking mechanism extends from the overlock housing and into the space.

Example 7: The locking system of example 6 that further includes a protective structure that covers at least part of the overlock locking mechanism in the space.

Example 8: The locking system of example 7, wherein the protective structure is a metal plate.

Example 9: The locking system of any of examples 1-8, wherein the overlock has one of the lock structures set forth in the previous lock examples herein.

Having thus described different embodiments, other variations and embodiments that do not depart from the spirit of this disclosure will become apparent to those skilled in the art. The scope of the claims is thus not limited to any particular embodiment, but is instead set forth in the claims and the legal equivalents thereof. Unless expressly stated in the written description or claims, the steps of any method recited in the claims may be performed in any order capable of yielding the desired product. No language in the specification should be construed as indicating that any non-claimed limitation is included in a claim. The terms "a" and "an" in the context of the following claims are to be construed to cover both the singular and the plural, unless otherwise indicated herein.

What is claimed is:

1. An overlock configured to be positioned alongside of a primary lock and engage the primary lock, wherein the overlock comprises (a) an overlock body; and (b) an engagement structure positioned at least partially in the overlock body and configured to engage a locking mechanism of the primary lock, wherein the overlock has (i) a locked position in which the engagement structure maintains the primary lock in a locked position, and (ii) an unlocked position in which the engagement structure permits the primary lock to move to an open position, the locking mechanism of the primary lock includes a first sliding bar movable along a longitudinal axis of the first sliding bar between a first, unlocked position and a second, locked position, and the engagement structure of the overlock includes a second sliding bar movable along the longitudinal axis between the unlocked position and the locked position.

2. The overlock of claim 1 that includes an opening configured to retain a leg of the engagement structure.

3. The overlock of claim 1, wherein the engagement structure is biased to the locked position or to the unlocked position.

4. The overlock of claim 1 that further includes an electric motor, and wherein the engagement structure is configured to be moved between the locked position and the unlocked position by the electric motor.

5. The overlock of claim 1 that further includes a pivot rod around which the engagement structure pivots from the locked position to the unlocked position and from the unlocked position to the locked position.

6. The overlock of claim 3, wherein the engagement structure is biased by a spring or by an electric motor.

7. The overlock of claim 1, wherein the engagement structure is partially inside of the body when in its unlocked position.

8. The overlock of claim 1, wherein:

the first sliding bar has a distal end and a first outwardly-extending tab on the distal end formed at a 90° angle from the longitudinal axis of the sliding bar; and the second sliding bar includes a second outwardly-extending tab on a distal end of the second sliding bar formed at a 90° angle from the longitudinal axis.

9. The overlock structure of claim 8, wherein the engagement structure is configured to engage the locking mechanism of the primary lock by receiving a hasp combiner over the first outwardly-extending tab and the second outwardly-extending tab which prevents the locking mechanism of the primary lock from moving with respect to the engagement structure of the overlock.

10. The overlock of claim 1 that has a receiver, a transmitter, and that can communicate on multiple radio frequencies.

11. The overlock of claim 10 that can communicate at either 2.4 GHz or 900 MHz or both.

12. The overlock of claim 10 that comprises a plurality of radios, wherein each radio operates on a different frequency.

13. The overlock of claim 12 that includes at least one radio configured to operate at 2.4 GHz and at least one radio configured to operate at 900 MHz.

14. The overlock of claim 1 that meshes to a backhaul unit via RF communications at 2.4 GHz.

15. The overlock of claim 14, wherein there is a plurality of backhaul units and the backhaul units communicate with each other via RF transmissions at 900 MHz or by power-over-ethernet.

16. The overlock of claim 10, wherein at least one radio of the plurality of radios operates at a lower frequency than the other of the plurality of radios, and the at least one radio operating at a lower frequency is configured to carry larger packets of data than the other of the plurality of radios and to communicate with a host via routers or repeaters.

17. The overlock of claim 13, wherein the at least one radio configured to operate at 2.4 GHz is configured to communicate with a smart device such as a cell phone.

18. The overlock of claim 12, wherein each of the plurality of radios can self-heal based upon other radios in a system.

19. The overlock of claim 12, wherein each of the plurality of radios has a guaranteed packet delivery structure.

20. The overlock structure of claim 1, wherein the locking mechanism of the primary lock permits the primary lock to move to an open position and moves the primary lock to the open position.

* * * * *